(12) United States Patent
Yabunaka et al.

(10) Patent No.: US 11,505,065 B2
(45) Date of Patent: Nov. 22, 2022

(54) VEHICLE CONTROL DEVICE

(71) Applicant: MAZDA MOTOR CORPORATION, Hiroshima (JP)

(72) Inventors: Sho Yabunaka, Hatsukaichi (JP); Masatoshi Takayama, Hiroshima (JP); Yusaku Takeda, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 729 days.

(21) Appl. No.: 16/467,329

(22) PCT Filed: Dec. 4, 2017

(86) PCT No.: PCT/JP2017/043522
§ 371 (c)(1),
(2) Date: Jun. 6, 2019

(87) PCT Pub. No.: WO2018/105568
PCT Pub. Date: Jun. 14, 2018

(65) Prior Publication Data
US 2020/0062116 A1 Feb. 27, 2020

(30) Foreign Application Priority Data

Dec. 7, 2016 (JP) .............................. JP2016-237320
Dec. 7, 2016 (JP) .............................. JP2016-237321

(51) Int. Cl.
*B60K 26/02* (2006.01)
*F02D 11/10* (2006.01)

(52) U.S. Cl.
CPC .......... *B60K 26/021* (2013.01); *F02D 11/106* (2013.01); *B60K 2026/023* (2013.01)

(58) Field of Classification Search
CPC ............ B60K 26/021; B60K 2026/023; B60K 26/02; B22C 15/04; B63H 16/00; F02D 11/106; F02D 11/10; F04B 47/024
See application file for complete search history.

(56) References Cited

U.S. PATENT DOCUMENTS

2004/0080405 A1  4/2004  Hijikata
2010/0204883 A1  8/2010  Honda
(Continued)

FOREIGN PATENT DOCUMENTS

DE  102015216756 A1 *  3/2017
EP  2 540 549 A1  1/2013
(Continued)

OTHER PUBLICATIONS

Kiguchi et al.; Ankle Muscle Synergies for Smooth Pedal Operation Under Various Lower-Limb Posture; Computer Science & Information Technology:71; 2017; pp. 71-78 (Year: 2017).*
(Continued)

*Primary Examiner* — Michael J Zanelli
(74) *Attorney, Agent, or Firm* — Studebaker & Brackett PC

(57) ABSTRACT

A vehicle control device includes a depression amount detection unit, a depression speed detection unit, a reaction force setting unit, and a reaction force generation unit. The reaction force setting unit sets a value of a reaction force in a manner of separating characteristics into advancement characteristics and return characteristics. The reaction force setting unit sets a value of a reaction force with respect to a depression amount in such a way that, in main advancement characteristics except for both ranges corresponding to start of depressing and end of depressing among advancement characteristics, a degree of increase of a value of a reaction force relatively decreases, as a depression amount increases until a predetermined ratio with respect to a maximum
(Continued)

depression amount of an accelerator pedal reaches, and a degree of increase of a value of a reaction force relatively increases, as a depression amount increases after the predetermined ratio reaches; and sets a value of the reaction force in such a way that a value of the reaction force decreases, as a depression amount decreases.

10 Claims, 26 Drawing Sheets

(56) References Cited

U.S. PATENT DOCUMENTS

| | | | | |
|---|---|---|---|---|
| 2011/0098901 A1* | 4/2011 | Shiomi | ............... | F02D 11/02 701/70 |
| 2012/0304800 A1* | 12/2012 | Sakaguchi | ........... | B60K 26/021 74/513 |

FOREIGN PATENT DOCUMENTS

| | | | |
|---|---|---|---|
| EP | 2 946 964 A1 | | 11/2015 |
| JP | 2006285306 A | | 10/2006 |
| JP | 2009041544 A | | 2/2009 |
| JP | 2013006485 A | | 1/2013 |
| JP | 5293784 B2 | | 9/2013 |
| JP | 2016000581 A | * | 1/2016 |
| JP | 2016000581 A | | 1/2016 |

OTHER PUBLICATIONS

International Search Report issued in PCT/JP2017/043522; dated Dec. 26, 2017.

The extended European search report issued by the European Patent Office dated Nov. 14, 2019, which corresponds to European Patent Application No. 17879404.6-1012 and is related to U.S. Appl. No. 16/467,329.

* cited by examiner

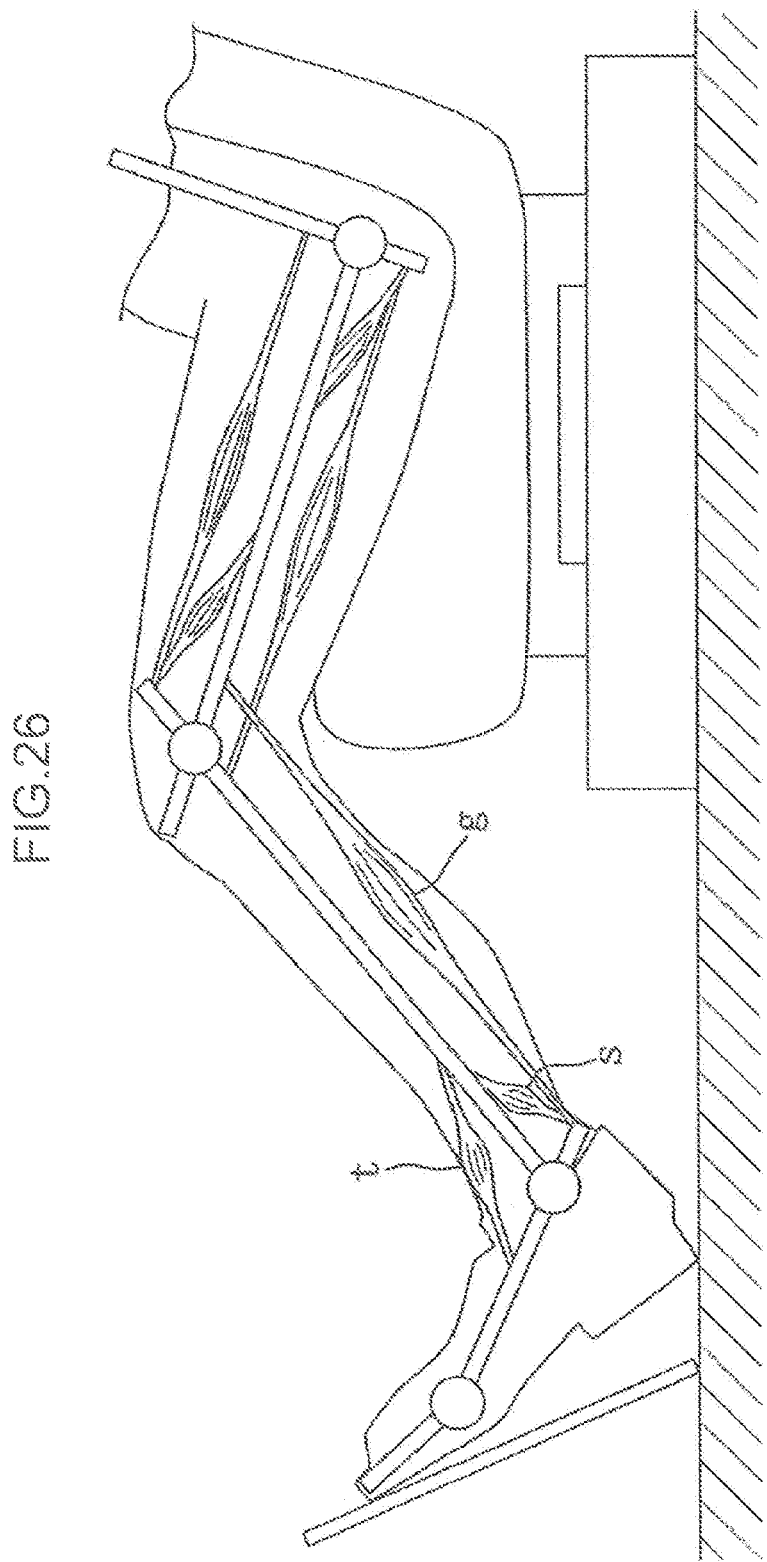

VEHICLE CONTROL DEVICE

TECHNICAL FIELD

The present disclosure relates to a vehicle control device capable of controlling a reaction force value of an accelerator pedal depending on muscle activity of a driver.

BACKGROUND ART

Conventionally, in a case of a vehicle mounted with a drive-by-wire engine, since accelerator pedal and output control equipment such as a throttle valve and a fuel injection device are not connected to each other by a cable, a reaction value according to a depression amount is applied to a driver by an electric actuator.

Since a depression amount of an accelerator pedal and a reaction force value are set to have a substantially proportional relationship, generally, a driver recognizes a depression amount of an accelerator pedal by a reaction force value to be applied from the accelerator pedal. Therefore, there is proposed a reaction force control device configured such that a driver's operation of depressing an accelerator pedal is guided depending on a driver's preference or a driving environment by changing a reaction force value of the accelerator pedal.

A vehicle driving operation assist device of Patent Literature 1 dynamically generates a driving intention sequence of a plurality of virtual drivers in a predetermined time zone in the past including a current point of time, calculates a driving operation amount sequence approximation degree representing a sequential approximation degree between a driving operation amount of a virtual driver and a driving operation amount of an actual driver for each driving intention sequence, estimates an actual driver's driving intention by comparing a plurality of driving operation amount sequence approximation degrees, and estimates an actual driver's state on the basis of the estimated driving intention.

In a case of an operation of depressing an accelerator pedal, a reaction force command value of the accelerator pedal is speedily lowered, as an elapsed time from a point of time when a driver intends to change a lane until a driver's driving intention is estimated to be changing a lane increases.

Further, there is also proposed a technique for setting reaction force characteristics of an accelerator pedal, taking into consideration perception characteristics of a human by the present applicant.

A vehicle accelerator pedal control device of Patent Literature 2 includes a reaction force setting means having a three-dimensional map, which is defined by a depression amount of an accelerator pedal, a depression speed of the accelerator pedal, and a reaction force value to be applied to a driver; and a depression speed detection means for detecting a depression speed of the accelerator pedal, wherein the reaction force setting means sets reaction force characteristics in such a way that a reaction force value of the accelerator pedal decreases, when a depression speed is high, as compared with a case where a depression speed is low.

Thus, it is possible to set reaction force characteristics suitable for a driving environment or a driving intention, while alleviating burden and incongruity of a driver.

A driver's operation of depressing and returning an accelerator pedal may be regarded as plantar flexion motion and dorsiflexion motion of an ankle joint in terms of muscle activity.

As illustrated in FIG. 26, an operation of an accelerator pedal by an ankle joint mainly involves an anterior tibialis muscle t, a soleus muscle s, and a gastrocnemius muscle g.

The anterior tibialis muscle t is a single articular muscle (one articular muscle) which performs dorsiflexion motion of an ankle joint, and the soleus muscle s is a single articular muscle which performs plantar flexion motion of an ankle joint. The gastrocnemius muscle g is a bilateral muscle which performs plantar flexion motion of an ankle joint and performs flexion motion of a knee joint. Among these skeletal muscles, a single articular muscle depends on a mechanical force ratio, and has a resistance to weight of raising a body against a gravitational force. Further, a bilateral muscle suppresses mechanical energy consumption, controls a direction of an external force, and has so-called propulsion capability of propelling a body in a specific direction.

Since a skeletal muscle has viscoelastic properties as mechanical properties, it is known that the skeletal muscle can be expressed by a two-element model constituted of a series elastic element and a contraction element; an elastic modulus of a series elastic element increases, as a muscle tension increases; there is a hyperbolic relationship between a load and a speed of a contraction element; and stiffness of the entirety of muscle has a linear relationship with respect to muscle activity.

CITATION LIST

Patent Literature

Patent Literature 1: Japanese Patent No. 5293784
Patent Literature 2: Japanese Unexamined Patent Application Publication No. 2016-000581

SUMMARY OF INVENTION

The accelerator pedal control device of Patent Literature 1 can determine a driver's driving intention by using a depression speed of an accelerator pedal as a parameter, and set reaction force characteristics suitable for the driving intention.

However, in the technique of Patent Literature 2, although it is possible to acquire a reaction force value of an accelerator pedal suitable for a driver's driving intention, there may occur a discrepancy between an operation amount (a physical reaction force value to be applied to a driver) with which a driver actually operates an accelerator pedal, and a reaction force perception amount which the driver instinctively feels from the accelerator pedal.

Since an amount of analyzing and processing information by a human brain increases in high speed motion, as compared with a case of low speed motion, recognition capability with respect to stimuli such as a reaction force is high when an operating speed is low in terms of perception characteristics of a human. Further, since an amount of instantaneous muscle activity increases in high speed motion, as compared with a case of low speed motion, and sensitivity to stimuli improves, discrimination capability with respect to stimuli such as a reaction force improves, as an operating speed increases in terms of perception characteristics of a human.

Therefore, even when a correlation (hereinafter, referred to as F-S characteristics) between a reaction force value of an accelerator pedal suitable for a driver, and a depression amount is set in a specific depression speed in driving a vehicle, in a case where a driving condition changes, and a depression speed changes, F-S characteristics suitable for a driver may not be necessarily acquired.

Specifically, since none of the patent literatures studies linear continuity of a reaction force perception amount relating to an operation of an accelerator pedal, namely, securing operation linearity regardless of a depression speed, a driver may not sufficiently and instinctively acquire a feeling of operating an accelerator pedal.

An object of the present disclosure is to provide a vehicle control device and the like, which let a driver sufficiently and instinctively perceive a feeling of operating an accelerator pedal, regardless of a depression speed of the accelerator pedal.

A vehicle control device according to an aspect of the present disclosure includes a depression amount detection unit for detecting a depression amount of an accelerator pedal; a depression speed detection unit for detecting a depression speed of the accelerator pedal; a reaction force setting unit for setting a value of a reaction force of the accelerator pedal on the basis of detection results by the depression amount detection unit and the depression speed detection unit; and a reaction force generation unit for controlling a mechanism of the accelerator pedal on the basis of a result set by the reaction force setting unit and generating the set reaction force. The reaction force setting unit sets a value of the reaction force in a manner of separating characteristics into advancement characteristics and return characteristics, the advancement characteristics being characteristics of a value of the reaction force having a correlation with respect to a depression amount of the accelerator pedal from start of depressing the accelerator pedal until end of depressing, and the return characteristics being characteristics of a value of the reaction force having a correlation with respect to a depression amount of the accelerator pedal from start of returning the accelerator pedal until end of returning. The reaction force setting unit sets a value of the reaction force with respect to the depression amount in such a way that, in main advancement characteristics except for both ranges corresponding to start of depressing and end of depressing among the advancement characteristics, a degree of increase of a value of the reaction force relatively decreases, as the depression amount increases until a predetermined ratio with respect to a maximum depression amount of the accelerator pedal reaches, and a degree of increase of a value of the reaction force relatively increases, as the depression amount increases after the predetermined ratio reaches. The reaction force setting unit sets a value of the reaction force in such a way that a value of the reaction force decreases, as the depression amount decreases in the return characteristics.

BRIEF DESCRIPTION OF DRAWINGS

FIG. 26 is an explanatory diagram of skeletal muscles when an accelerator pedal is operated.

DESCRIPTION OF EMBODIMENTS

In the following, embodiments are described in detail on the basis of drawings.

The following description is an example in which a configuration of the present disclosure is applied to a vehicle control device. The following description does not limit the present disclosure, an application thereof, or a use thereof.

First Embodiment

In the following, a first embodiment is described on the basis of FIGS. 1 to 21.

A vehicle control device 1 is configured to provide a driver with operation linearity regardless of a depression speed by controlling a reaction force value of an accelerator pedal 3 depending on muscle activity of the driver.

Figure 1:
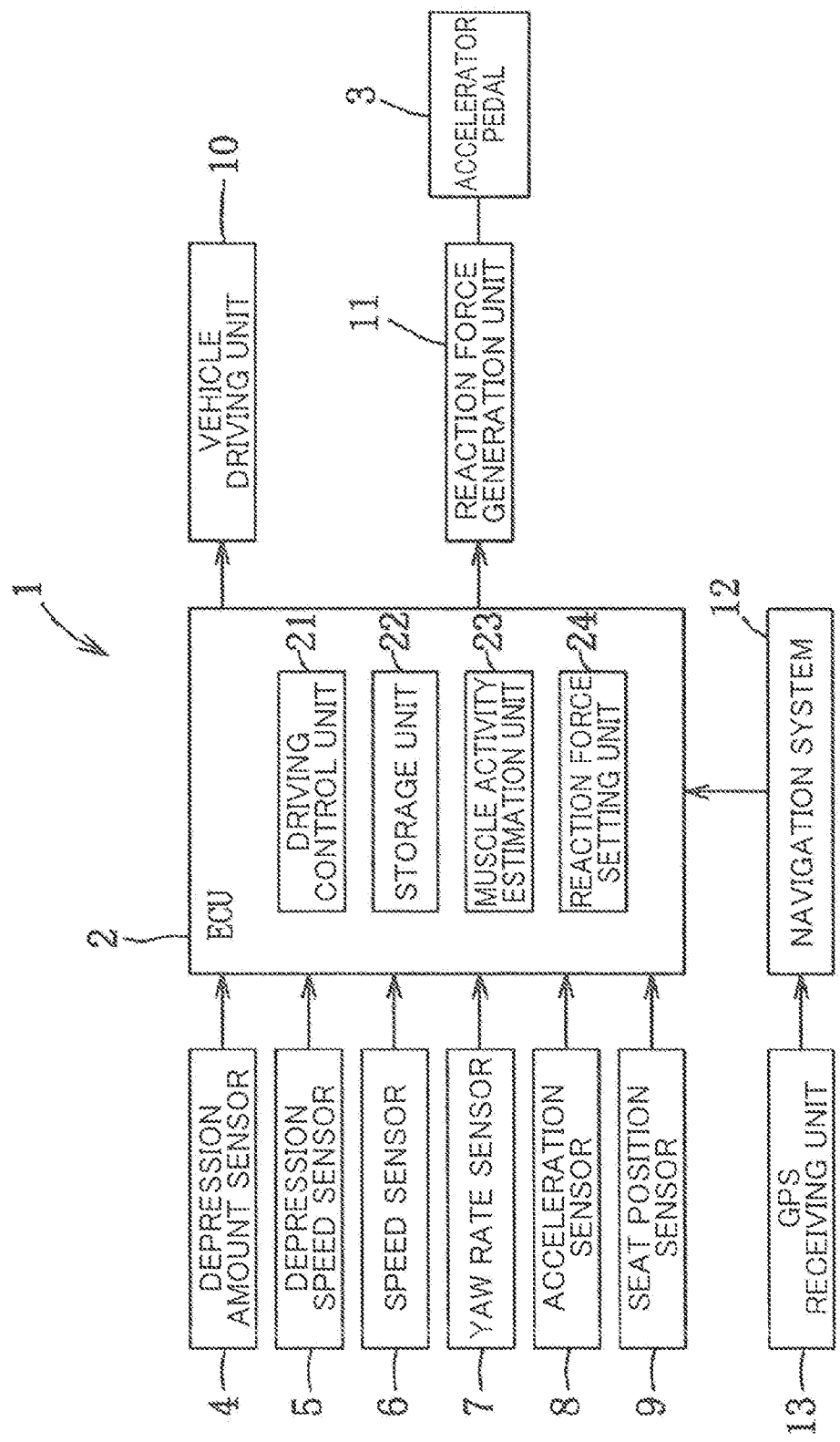
FIG. 1 is a block diagram of a vehicle control device according to a first embodiment.

As illustrated in FIG. 1, the control device 1 includes an electronic control unit (ECU) 2. The ECU 2 is an electronic control unit constituted of a CPU, an ROM, an RAM, and the like. The ECU 2 loads an application program stored in an ROM into an RAM, and performs various calculation processing by causing a CPU to execute the application program.

The ECU 2 is electrically connected to a depression amount sensor 4 for detecting an operation amount S (hereinafter, referred to as a depression amount) of depressing or returning the accelerator pedal 3, a depression speed sensor 5 (a depression speed detection unit) for detecting a depression speed V of the accelerator pedal 3, a speed sensor 6 for detecting a traveling speed of a vehicle, a yaw rate sensor 7 for detecting a yaw rate acting on a vehicle, an acceleration sensor 8 for detecting an acceleration of a traveling vehicle, a seat position sensor 9 (a seat position detection unit) for detecting a seat position of a driver, a vehicle driving unit 10, a reaction force control mechanism 11 (a reaction force generation unit), a navigation system 12, and the like.

Figure 2:
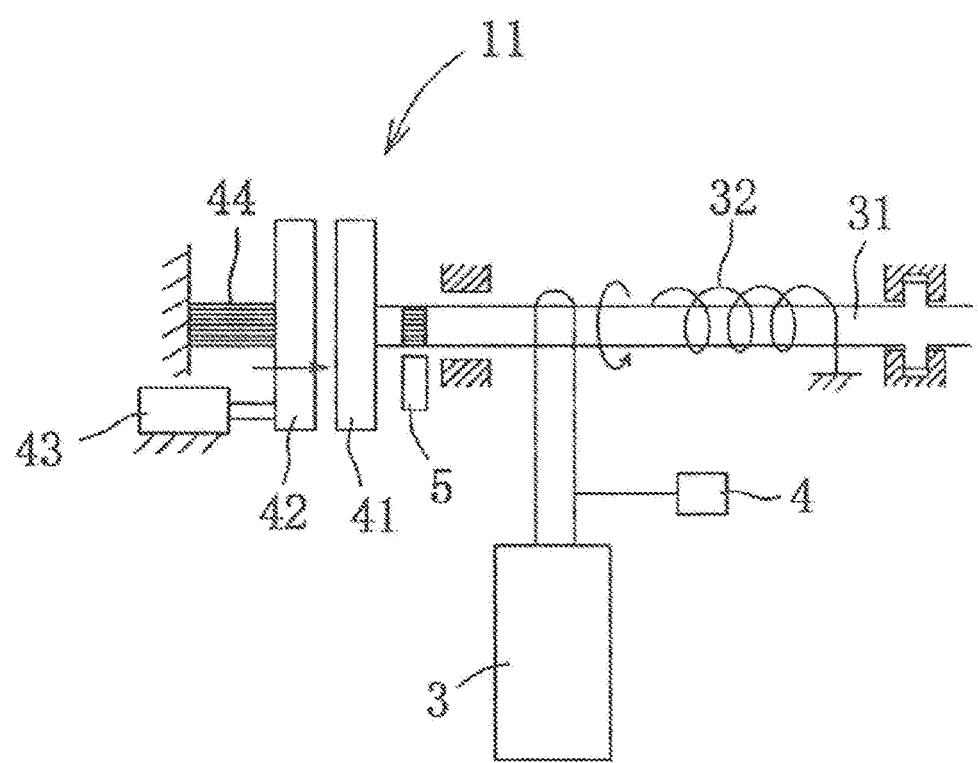
FIG. 2 is a schematic diagram of an accelerator pedal and a reaction force control mechanism.

As illustrated in FIG. 2, the accelerator pedal 3 is pivotally held with respect to a vehicle body. A driver's intention of increasing or decreasing an engine output is input to the accelerator pedal 3 by a driver's depressing operation.

The depression amount sensor 4 is provided on the accelerator pedal 3 or a rotating shaft 31, and detects a depression stroke of the accelerator pedal 3, namely, a so-called depression amount S from a return amount of the accelerator pedal 3 or the rotating shaft 31. The depression amount S of the accelerator pedal 3 detected by the depression amount sensor 4 is output to the ECU 2. Note that it is configured such that, when a depressing force by a driver's depressing operation does not act, the accelerator pedal 3 is urged to return to an initial position where the depression amount S is zero by a return spring 32, which is connected to the accelerator pedal 3.

The depression speed sensor 5 is provided on the rotating shaft 31 of the accelerator pedal 3, and detects a depression speed V of the accelerator pedal 3 from a rotational speed of the rotating shaft 31. A depression speed V of the accelerator pedal 3 detected by the depression speed sensor 5 is output to the ECU 2.

Figure 8:
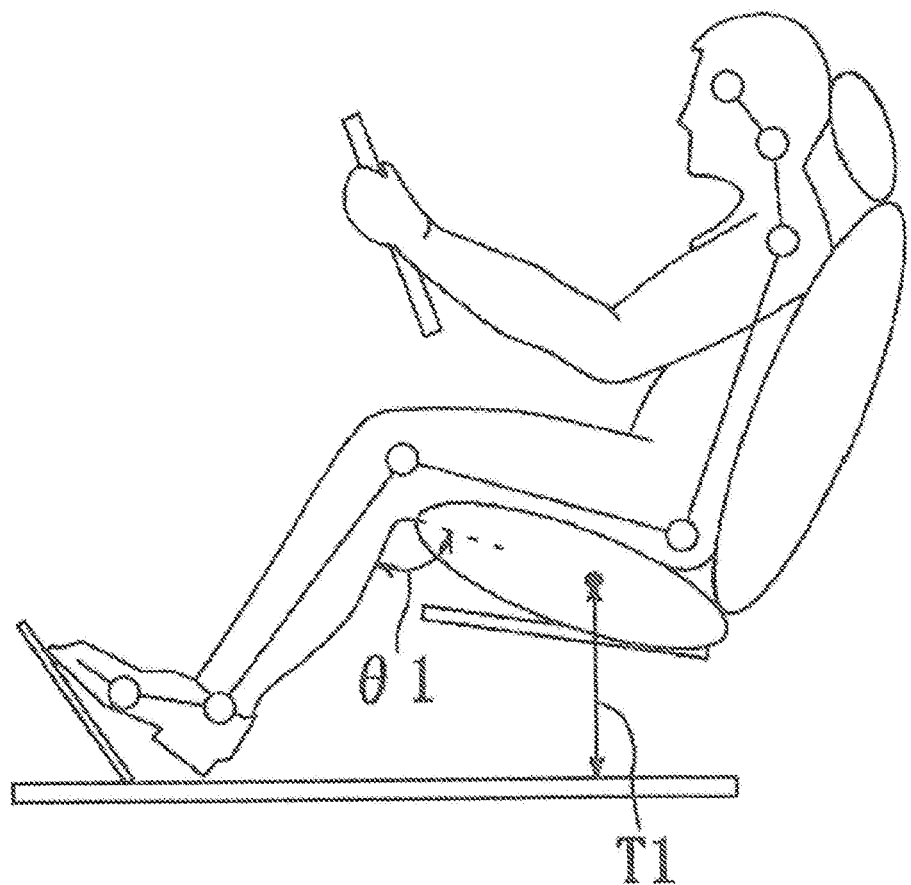
FIG. 8 is a diagram describing a relationship between a knee angle of a driver and a height position of a seat, and illustrates a state that a seat is set to a high position.
Figure 9:
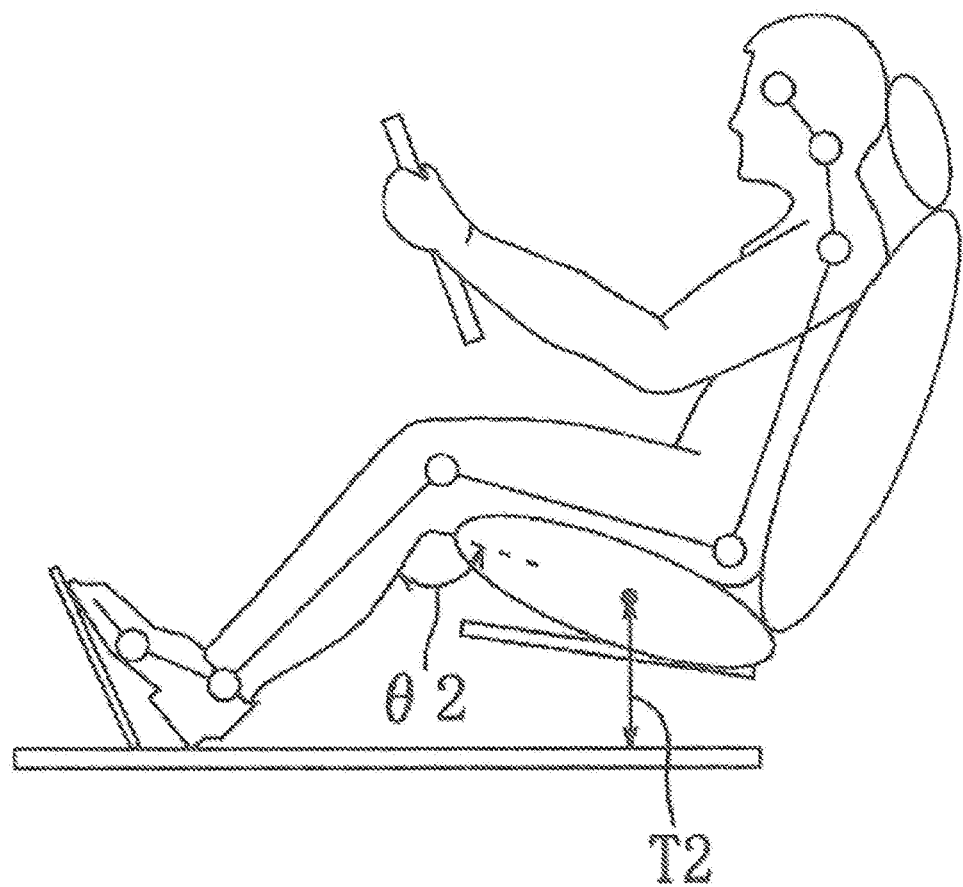
FIG. 9 is a diagram describing a relationship between a knee angle of a driver and a height position of a seat, and illustrates a state that a seat is set to an intermediate position.
Figure 10:
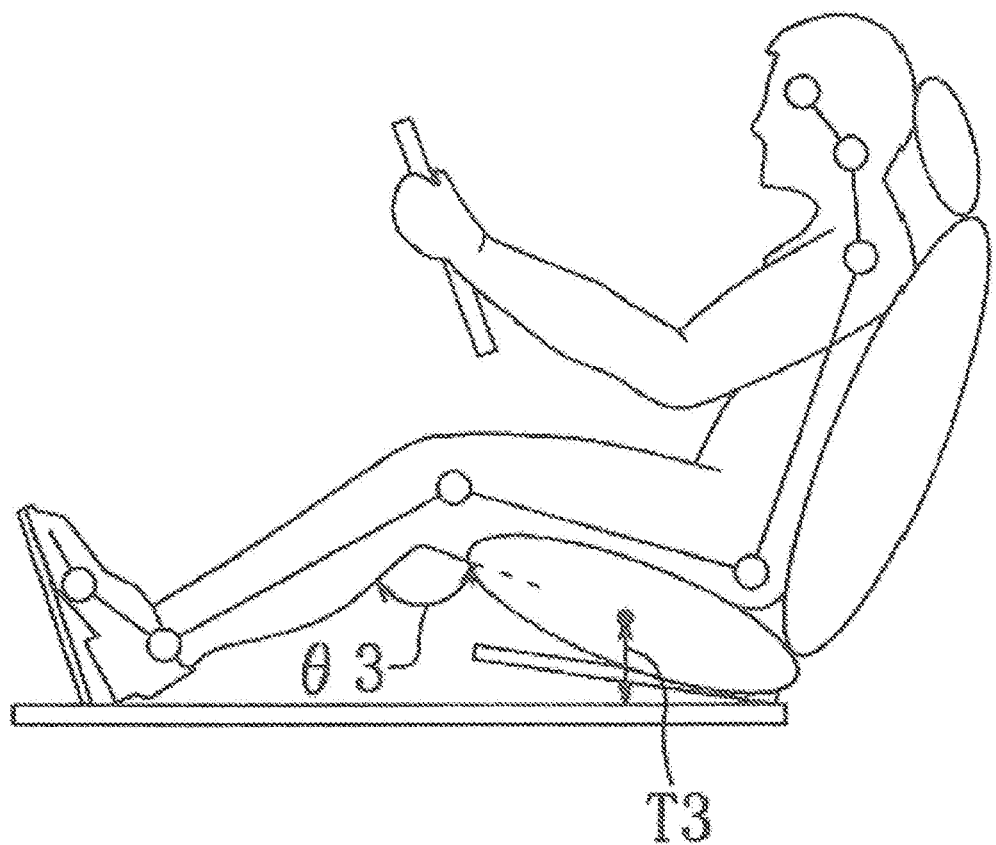
FIG. 10 is a diagram describing a relationship between a knee angle of a driver and a height position of a seat, and illustrates a state that a seat is set to a low position.

The seat position sensor 9 detects a distance in an up-down (vertical) direction from a center position of a seat cushion to a floor panel, as a seat height T (T1, T2, T3) (see FIGS. 8 to 10). Further, the seat position sensor 9 detects a distance in a front-rear (horizontal) direction from a rear end position of a slide rail to the center position of the seat cushion, as a slide amount L (L1, L2, L3) (see FIGS. 11 to 13). A seat height T and a slide amount L detected by the seat position sensor 9 are output to the ECU 2.

Each of the speed sensor 6, the yaw rate sensor 7, and the acceleration sensor 8 outputs a detection result thereof to the ECU 2.

The vehicle driving unit 10 is a driving mechanism and a steering mechanism for controlling driving of a vehicle.

The vehicle driving unit 10 is constituted of an engine control unit, a steering actuator, a brake actuator, a shift actuator (each of which is not illustrated), and the like.

The vehicle driving unit 10 controls driving of a vehicle on the basis of an output signal from the ECU 2.

As illustrated in FIG. 2, the reaction force control mechanism 11 includes a first friction member 41, a second friction member 42, an electromagnetic actuator 43, and the like.

The first friction member 41 is fixed to one end of the rotating shaft 31, and the second friction member 42 is disposed to face the first friction member 41. The second friction member 42 is non-rotatably held with respect to a retaining shaft 44 which axially extends along the rotating shaft 31, and is axially movable relative to the retaining shaft 44.

The actuator 43 is configured to change a relative positional relationship of the first and second friction members 41 and 42 between a close contact state and a spaced state, and make a contact pressure in a close contact state adjustable.

The navigation system 12 is a system for navigating a route of a vehicle.

As illustrated in FIG. 1, the navigation system 12 is electrically connected to a GPS receiving unit 13 for detecting a current position of a vehicle. The GPS receiving unit 13 detects a current position of a vehicle by receiving a signal from a plurality of GPS satellites.

Further, the navigation system 12 includes a map database for storing road map data, and a traffic rule database for storing traffic rule data.

The navigation system 12 navigates a driver to a destination by using current position data of a vehicle by the GPS receiving unit 13, road map data of a map database, and traffic rule data of a traffic rule database.

Thus, the navigation system 12 outputs, to the ECU 2, current position data of a vehicle, road map data, and traffic rule data.

Next, the ECU 2 is described.

As illustrated in FIG. 1, the ECU 2 includes a driving control unit 21, a storage unit 22, a muscle activity estimation unit 23, a reaction force setting unit 24, and the like.

The driving control unit 21 is configured such that an output of an engine is controlled, on the basis of a depression amount S of the accelerator pedal 3, and a vehicle speed detected by the speed sensor 6; and a gear ratio of a transmission is selectable on the basis of a vehicle traveling state and a driving state of the engine.

An output of an engine decelerated by a transmission is transmitted to driving wheels via a drive shaft (not illustrated).

The storage unit 22 stores in advance a three-dimensional map M, which is defined by a depression amount S and a depression speed V of the accelerator pedal 3 by a driver, and a reaction force F corresponding to a physical reaction force value acting on the driver from the accelerator pedal 3.

Figure 3:
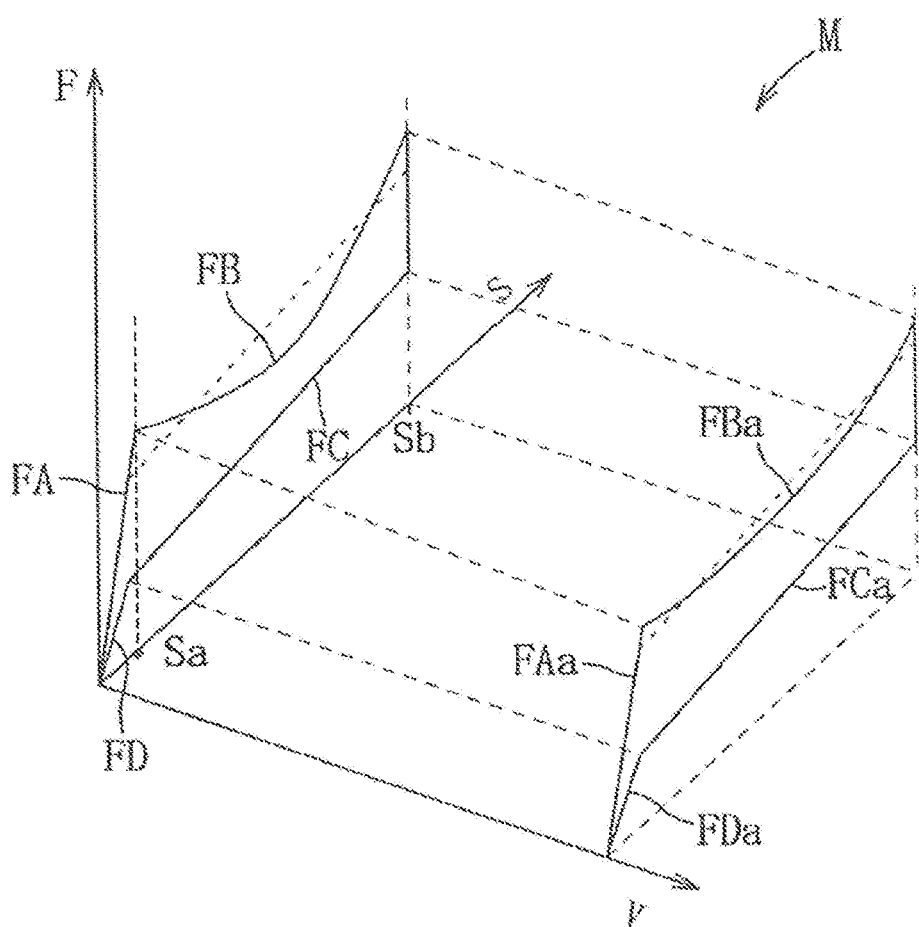
FIG. 3 is a diagram illustrating a three-dimensional map.

As illustrated in FIG. 3, the three-dimensional map M is sterically formed by three axes, namely, an S-axis (a vertical axis) corresponding to a depression amount S (Sa to Sd) of the accelerator pedal 3, a V-axis (a horizontal axis) corresponding to a depression speed V of the accelerator pedal 3, and an F-axis (a height axis) corresponding to a reaction force F (Fa to Ff) to be applied to a driver via the accelerator pedal 3.

Basic characteristics of the three-dimensional map M are formed by using a standard driver as a target, and are set on the basis of a premise that, in a driver's predetermined operation of the accelerator pedal 3, namely, in an operation of depressing and returning (plantar flexion motion and dorsiflexion motion of an ankle joint), a bilateral muscle (e.g., a gastrocnemius muscle) and a single articular muscle (e.g. an anterior tibialis muscle or a soleus muscle) are operated within a predetermined balance range (e.g. a range where a rate of contribution of a bilateral muscle is not smaller than 40% but not larger than 60%). Note that a numerical value of a balance range is acquired in advance by an experiment or the like.

Regarding correlation characteristics (hereinafter, referred to as F-S characteristics) between a reaction force F and a depression amount S in a three-dimensional map M, depression-side characteristics are constituted of initial advancement characteristics FA (FAa) from start of depression until an initial depression amount Sa, which corresponds to a depression start range, and main advancement characteristics FB (FBa to FBf) from the initial depression amount Sa to a maximum depression amount Sb. Further, return-side characteristics are constituted of main return characteristics FC (FCa to FCC from the maximum depression amount Sb to the initial depression amount Sa, and terminal return characteristics FD (FDa) from the initial depression amount Sa until end of returning, which corresponds to a depression end range.

Note that, unless otherwise specifically mentioned, for convenience, the following description is made with use of a depression amount S, a reaction force F, and characteristics FA, FB, FC, and FD, while using a depression amount S (Sa to Sd), a reaction force F (Fa to Ff), characteristics FA (FAa), FB (FBa to FBf), FC (FCa to FCC, and FD (FDa) as representative symbols, respectively.

Further, in the foregoing, an "initial depression amount Sa" is settable to a ratio within a range from 2.5% to 5.0% with respect to a maximum depression amount of the accelerator pedal 3, for example.

Figure 4:
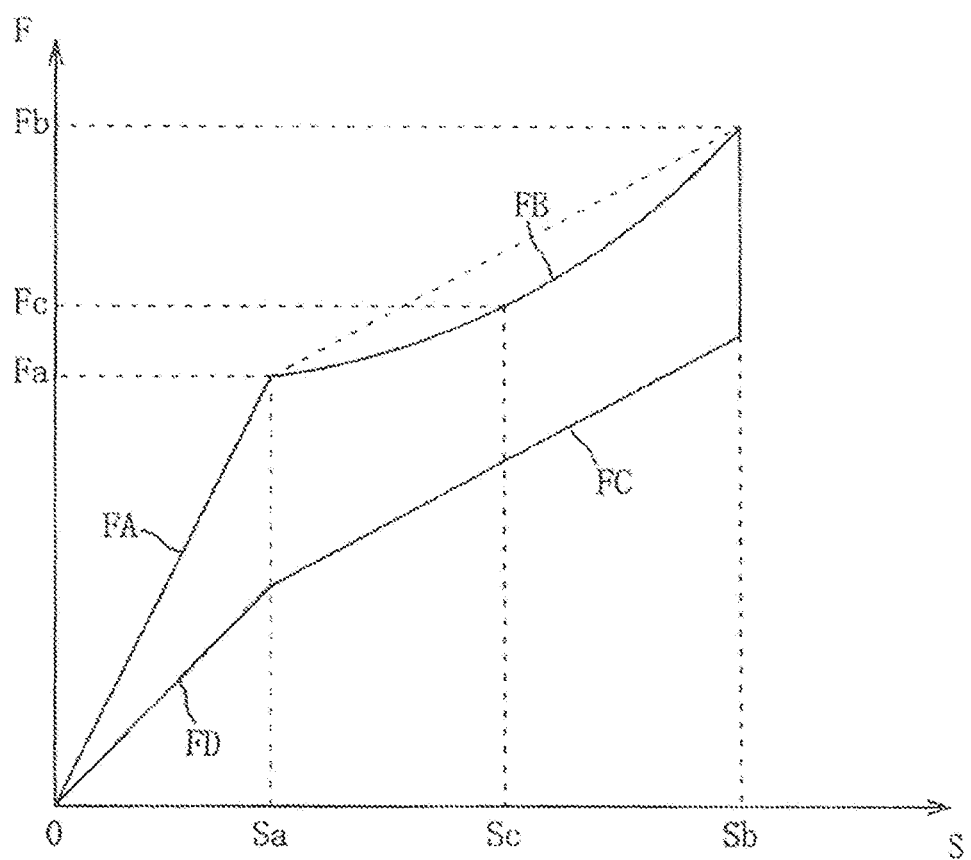
FIG. 4 is a diagram describing F-S characteristics of a three-dimensional map, and illustrates a graph of F-S characteristics at a low depression speed.

As illustrated in FIGS. 3 and 4, initial advancement characteristics FA are set in such a way as to linearly increase, as a depression amount S increases; and main advancement characteristics FB are set in such a way as to increase and protrude downward, as the depression amount S increases. In other words, in main advancement characteristics FB, a relationship between a depression amount S and a reaction force F is set in such a way that a degree of increase of a value of a reaction force F relatively decreases in a zone until a predetermined depression amount S, and a degree of increase of a value of a reaction force F relatively increases in a zone over the predetermined depression amount S.

Note that, in the foregoing, a "predetermined depression amount S" is settable to a ratio within a range from 40% to 60% (in the present embodiment, 50% as an example) with respect to a total depression amount in main advancement characteristics FB, for example.

Main return characteristics FC are set in such a way as to linearly decrease, as a depression amount S decreases. Terminal return characteristics FD are set in such a way as to linearly decrease with a tendency of decrease larger than main return characteristics FC.

Since a reaction force perception amount P (a sensory strength) perceived as a feeling of a driver is proportional to a logarithm of a reaction force F (a stimulation strength) (the Weber-Fechner rule), it is possible to acquire a value or a tendency of a reaction force F on the basis of the reaction force perception amount P having a predetermined tendency by the following Equation (1).

$$P = k\log(F) + K \quad (1)$$

where K is an integral constant.

Figure 6:
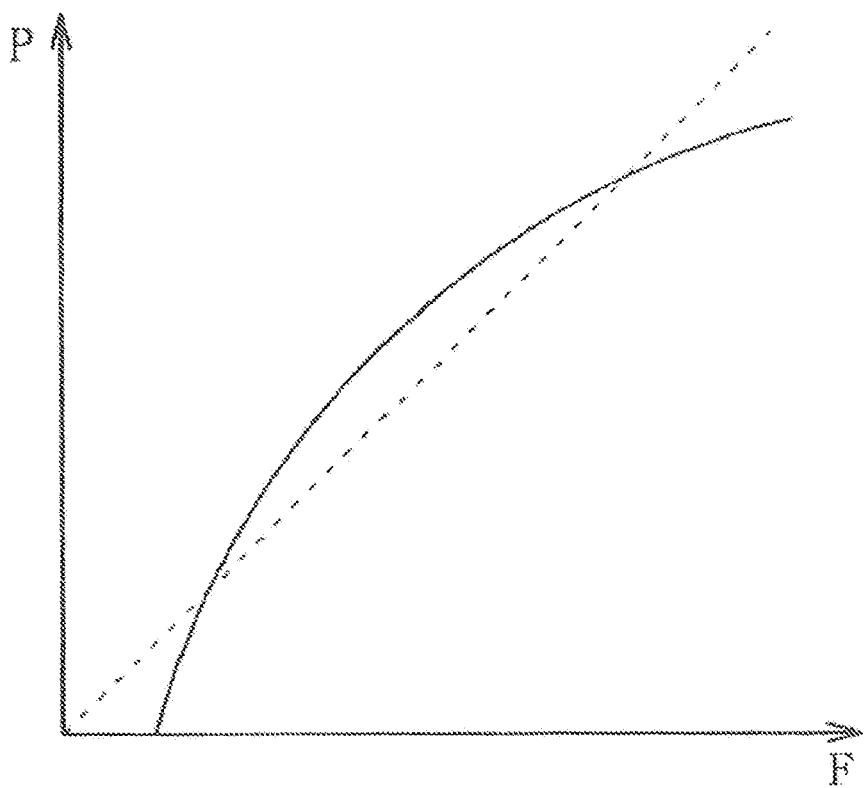
FIG. 6 is a diagram describing P-F characteristics, and illustrates a graph of P-F characteristics at a low depression speed.

As illustrated in FIG. 6, it is possible to allow a driver to perceive (feel) a reaction force perception amount P having linear continuity, which is illustrated by the broken line, by setting correlation characteristics (hereinafter, referred to as P-F characteristics) between the reaction force perception amount P and the reaction force F to have an upward-convex logarithmic functional shape. Therefore, as illustrated in FIG. 4, regarding F-S characteristics at a low depression speed, main advancement characteristics FB corresponding to a range from an initial depression amount Sa and a position of a reaction force Fa to a maximum depression amount Sb and a position of a reaction force Fb are set to have a downward-convex exponential functional shape, which is acquired by inverting the upward-convex logarithmic functional shape illustrated in FIG. 6.

The main advancement characteristics FB are set in such a way that a rate of change in tangent angle of the main advancement characteristics FB decreases, as the main advancement characteristics FB approach an intermediate depression amount Sc (a reaction force Fc) which is a midpoint between an initial depression amount Sa and a maximum depression amount Sb.

Further, the three-dimensional map M is set in such a way that a degree of non-linearity of main advancement characteristics FB decreases, as a depression speed V of the accelerator pedal 3 increases.

Figure 5:
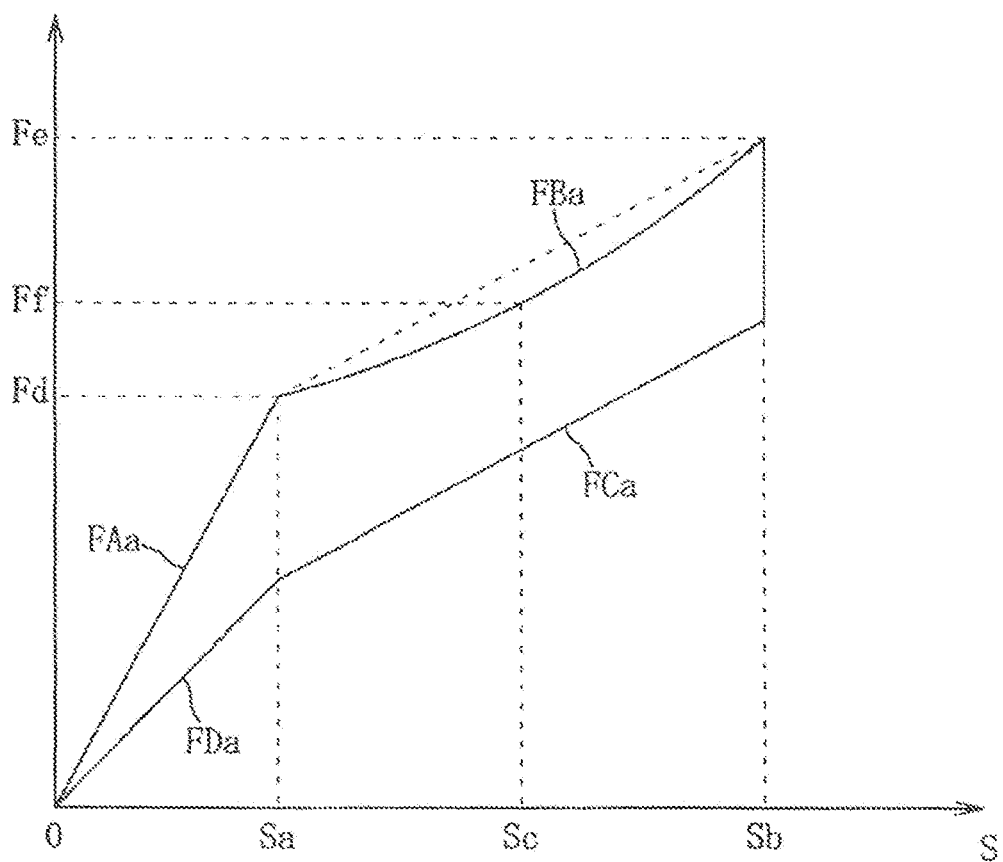
FIG. 5 is a diagram describing F-S characteristics of a three-dimensional map, and illustrates a graph of F-S characteristics at a high depression speed.
Figure 7:
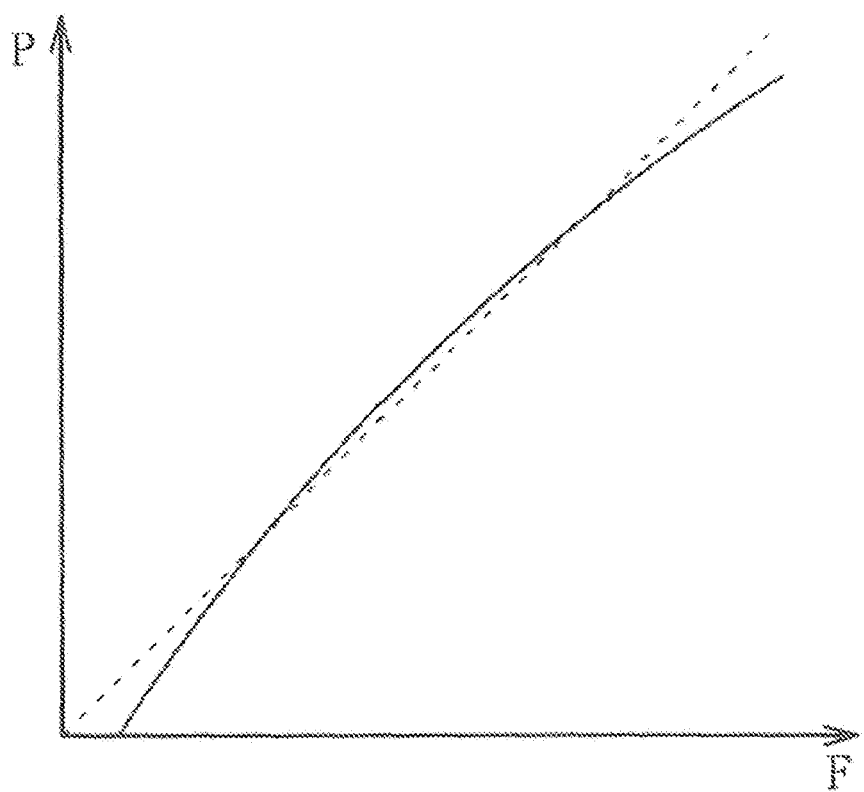
FIG. 7 is a diagram describing P-F characteristics, and illustrates a graph of P-F characteristics at a high depression speed.

As illustrated in FIG. 7, P-F characteristics in a high depression speed range are set to have an upward-convex logarithmic functional shape, which is formed in such a way that a rate of change in tangent angle in terms of P-F characteristics decreases, as compared with P-F characteristics in a low depression speed range illustrated in FIG. 6. Therefore, as illustrated in FIG. 5, in F-S characteristics at a high depression speed, main advancement characteristics FBa corresponding to a range from an initial depression amount Sa and a position of a reaction force Fd to a maximum depression amount Sb and a position of a reaction force Fe are set to have a downward-convex exponential functional shape in which a rate of change in tangent angle is small, as compared with the main advancement characteristics FB illustrated in FIG. 4.

This is for the purpose of letting a driver strongly perceive linear continuity in a low depression speed range where stimulation recognition capability is high, as compared with a high depression speed range where stimulation recognition capability is low, thereby letting the driver instinctively and empirically perceive operation linearity regardless of a depression speed V.

Further, similarly to main advancement characteristics FB, main advancement characteristics FBa are set in such a way that a rate of change in tangent angle of the main advancement characteristics FBa decreases, as the main advancement characteristics FBa approach an intermediate depression amount Sc (a reaction force Ff) which is a midpoint between an initial depression amount Sa and a maximum depression amount Sb.

Note that a degree of non-linearity may be adjusted by using an inverse number of a radius of curvature in a specific range, in place of the above-described rate of change in tangent angle.

Next, the muscle activity estimation unit 23 is described.

The muscle activity estimation unit 23 is configured in such a way as to estimate a rate of contribution of a bilateral muscle with respect to an operation of the accelerator pedal 3 on the basis of a posture state of a driver.

A bilateral muscle has characteristics such that energy efficiency is high, and an operating speed is fast, as compared with a single articular muscle. In view of the above, when a driver's driving posture is a posture in which a rate of contribution of a bilateral muscle is small in operating the accelerator pedal 3, a ratio of activity of a bilateral muscle among skeletal muscles around an ankle joint is increased by increasing a reaction force F of the accelerator pedal 3, thereby increasing a rate of contribution with respect to muscle activity of a bilateral muscle in a driver's operation of depressing and returning the accelerator pedal 3.

The muscle activity estimation unit 23 determines a posture state of a driver by using a seat position detected by the seat position sensor 9 as a parameter.

As illustrated in FIG. 8, when a seat height T adjusted by a driver is T1, a driver's knee is bent, and a knee angle θ1 decreases. Therefore, a rate of contribution of a bilateral muscle in bending motion and dorsiflexion motion of an ankle joint decreases (a rate of contribution of a single articular muscle increases).

As illustrated in FIG. 9, when a seat height T adjusted by a driver is T2 (T2<T1), since a knee angle θ2 of the driver is larger than the knee angle θ1, a rate of contribution of a bilateral muscle at the knee angle θ2 increases, as compared with a rate of contribution of a bilateral muscle at the knee angle θ1.

As illustrated in FIG. 10, when a seat height T adjusted by a driver is T3 (T3<T2), since a knee angle θ3 of the driver is larger than the knee angle θ2, a rate of contribution of a bilateral muscle at the knee angle θ3 increases, as compared with a rate of contribution of a bilateral muscle at the knee angle θ2.

Thus, it is estimated that a rate of contribution of a bilateral muscle increases, as a seat height T decreases.

Figure 11:
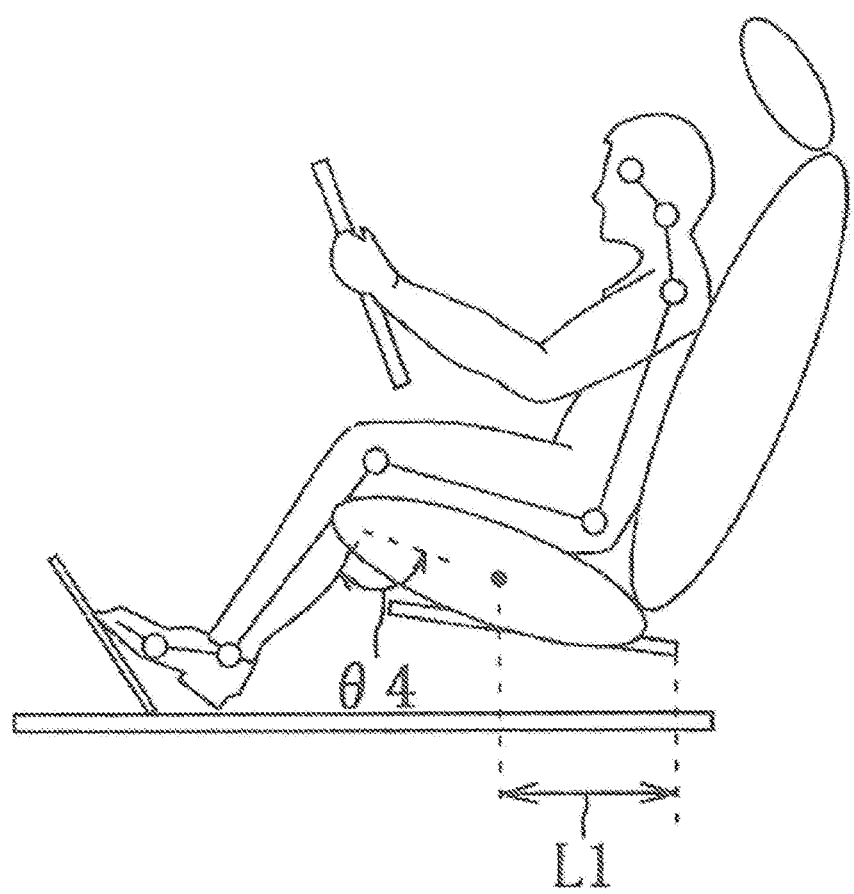
FIG. 11 is a diagram describing a relationship between a knee angle of a driver and a slide position of a seat, and illustrates a state that a seat is set to a front position.

As illustrated in FIG. 11, when a slide amount L adjusted by a driver is L1 (when a driver is a woman or a person having a small physical size), since a knee angle θ4 of the driver decreases, a rate of contribution of a bilateral muscle in bending motion and dorsiflexion motion of an angle joint decreases.

Figure 12:
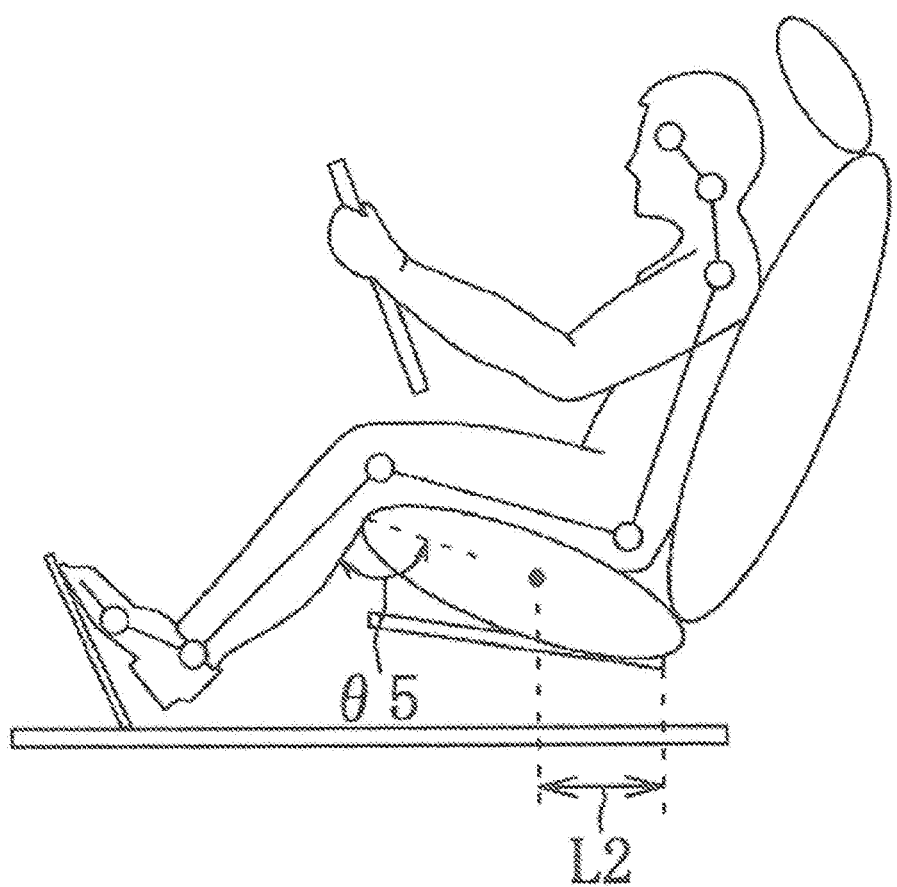
FIG. 12 is a diagram describing a relationship between a knee angle of a driver and a slide position of a seat, and illustrates a state that a seat is set to an intermediate position.

As illustrated in FIG. 12, when a slide amount L adjusted by a driver is L2 (when a driver has a standard physical size) (L2<L1), since a knee angle θ5 is larger than the knee angle θ4, a rate of contribution of a bilateral muscle at the knee angle θ5 increases, as compared with a rate of contribution of a bilateral muscle at the knee angle θ4.

Figure 13:
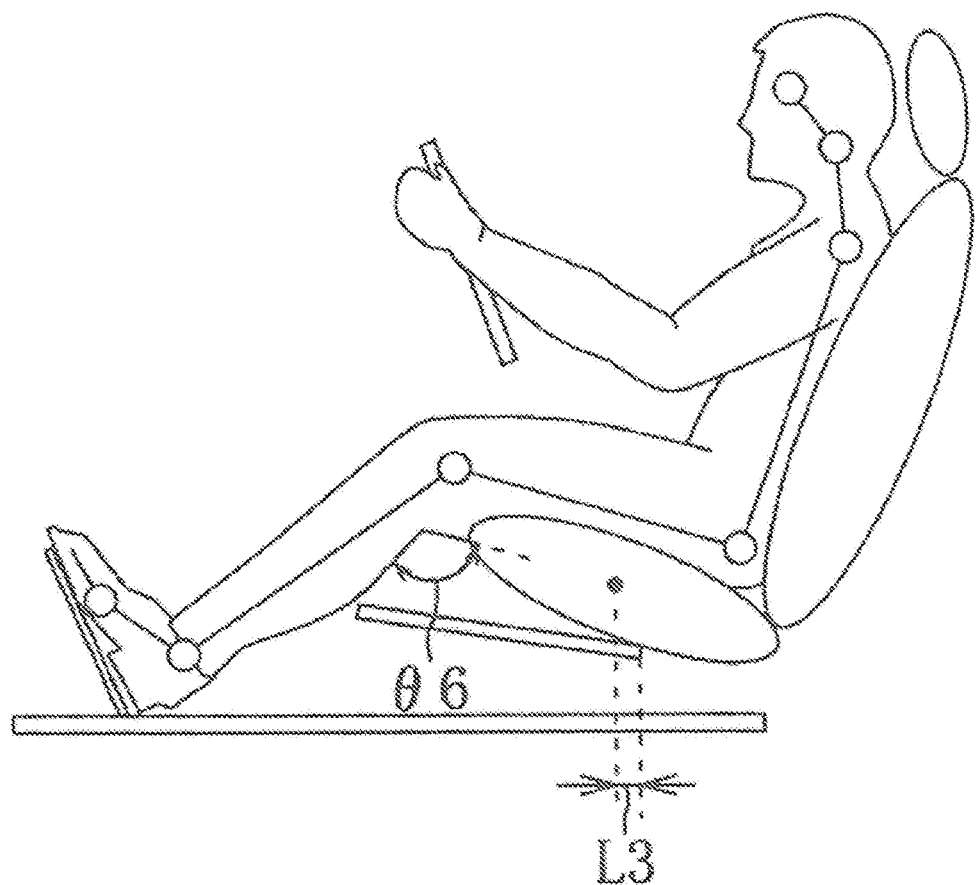
FIG. 13 is a diagram describing a relationship between a knee angle of a driver and a slide position of a seat, and illustrates a state that a seat is set to a rear position.

As illustrated in FIG. 13, when a slide amount L adjusted by a driver is L3 (when a driver has a large physical size) (L3<L2), since a knee angle θ6 is larger than the knee angle θ5, a rate of contribution of a bilateral muscle at the knee angle θ6 increases, as compared with a rate of contribution of a bilateral muscle at the knee angle θ5.

Thus, it is estimated that a rate of contribution of a bilateral muscle increases, as a slide amount L decreases.

The muscle activity estimation unit 23 respectively estimates that, when an addition value T+L, which is acquired by adding a seat height T and a slide amount L, is smaller than a threshold value A, a rate of contribution of a bilateral muscle becomes large; when the addition value T+L is not smaller than the threshold value A but not larger than a threshold value B (A<B), a rate of contribution of a bilateral muscle becomes intermediate; and when the addition value T+L is larger than the threshold value B, a rate of contribution of a bilateral muscle becomes small.

Note that the threshold values A and B are acquired in advance by an experiment or the like on the basis of articular viscoelastic properties of a human.

Further, the muscle activity estimation unit 23 is configured to estimate whether a main working muscle of the lower limb of a human body which is an activity subject is a single articular muscle or a bilateral muscle on the basis of a traveling condition during driving, specifically, a depression speed V of the accelerator pedal 3 at a depression initial stage.

At rapid acceleration (e.g., an acceleration operation for less than 1 sec. when a depression speed V is large), a bilateral muscle in which an operating speed is fast and an operating force is large is suitable as a main working muscle. At intermediate acceleration (e.g., an acceleration operation for 1 to 3 sec. when a depression speed V is small, as compared with rapid acceleration), a state (balance range) in which a single articular muscle and a bilateral muscle are well-balanced is suitable. At slow acceleration (e.g., an acceleration operation for 3 sec. or longer, when a depression speed V is small, as compared with intermediate acceleration), a single articular muscle in which operation accuracy of an operation of depressing and returning is high is suitable as a main working muscle. In view of the above, when a rapid acceleration operation is detected in operating the accelerator pedal 3, it is estimated that a bilateral muscle is a main working muscle which is an activity subject; when an intermediate acceleration operation is detected, it is estimated that a single articular muscle and a bilateral muscle are to be cooperated; and when a slow acceleration operation is detected, it is estimated that a single articular muscle is a main working muscle which is an activity subject.

The muscle activity estimation unit 23 determines a driving condition by a depression speed V and an operation time of the accelerator pedal 3 detected by the depression speed sensor 5.

Next, the reaction force setting unit 24 is described.

The reaction force setting unit 24 is configured to correct a reaction force F in main advancement characteristics FB on the basis of a rate of contribution with respect to muscle activity of a bilateral muscle, which is estimated by the muscle activity estimation unit 23.

The reaction force setting unit 24 respectively sets a posture correction coefficient K1 for correcting a reaction force F of main advancement characteristics FB depending on an estimated rate of contribution of a bilateral muscle.

In the present embodiment, when a rate of contribution of a bilateral muscle is large, since the bilateral muscle sufficiently acts, the posture correction coefficient K1 is set to zero so as to maintain basic characteristics. When a rate of contribution of a bilateral muscle is intermediate, the posture correction coefficient K1 is set to K1a (0<K1a) in such a way that a reaction force F increases in order to increase the rate of contribution of the bilateral muscle. When a rate of contribution of a bilateral muscle is small, the posture correction coefficient K1 is set to K1b, which is a value larger than K1a, in order to further increase the rate of contribution of the bilateral muscle.

The reaction force setting unit 24 is configured to correct a reaction force F of main advancement characteristics FB on the basis of a main working muscle, which is estimated by the muscle activity estimation unit 23.

The reaction force setting unit 24 respectively sets a main advancement characteristic correction coefficient K2 for correcting a reaction force F of main advancement characteristics FB depending on an estimated main working muscle which is an activity subject.

In the present embodiment, when a depression speed V is equal to or lower than 0, the main advancement characteristic correction coefficient K2 is set to zero so as to maintain basic characteristics. When a depression speed V corresponds to slow acceleration, the main advancement characteristic correction coefficient K2 is set to K2a (K2a<0) in such a way that a reaction force F of main advancement characteristics FB decreases. When a main working muscle for a forward operation (a depressing operation) is a bilateral muscle, and a depression speed V corresponds to intermediate acceleration, the main advancement correction coefficient K2 is set to K2b (K2a<K2b<0) in such a way that a reaction force F decreases. When a main working muscle for a forward operation (a depressing operation) is a single articular muscle, and a depression speed V corresponds to intermediate acceleration, the main advancement characteristic correction coefficient K2 is set to K2c (0<K2c) in such a way that a reaction force F increases. When a depression speed V corresponds to rapid acceleration, the main advancement characteristic correction coefficient K2 is set to K2d, which is a value larger than K2c, in order to further increase the reaction force F.

The main advancement characteristic correction coefficient K2a is a coefficient for correcting a reaction force F of main advancement characteristics FB in basic characteristics to a predetermined reaction force F at which a rate of contribution of a single articular muscle is substantially equal to or larger than 60% in order to substantially make a rate of contribution of a bilateral muscle lower than 40%, which corresponds to a lower limit of the above-described balance range. The main advancement characteristic correction coefficients K2b and K2c are coefficients for correcting a reaction force F of main advancement characteristics FB in basic characteristics to a predetermined reaction force F at which a rate of contribution of a bilateral muscle is within a balance range (a range where a rate of contribution of a bilateral muscle is not smaller than 40% but not larger than 60%). The main advancement characteristic correction coefficient K2d is a coefficient for correcting a reaction force F of main advancement characteristics FB in basic characteristics to a predetermined reaction force F at which a rate of contribution of a bilateral muscle is substantially equal to or larger than 60% in order to substantially make a rate of contribution of a bilateral muscle larger than 60%, which corresponds to an upper limit of a balance range. The main advancement correction coefficients K2a to K2d may not be necessarily set on the basis of an upper limit and a lower limit of a balance range, and may be set on the basis of a design condition, as necessary.

Further, when a vehicle is started with a rapid acceleration operation, the reaction force setting unit 24 calculates initial characteristics (initial advancement characteristics FAa and terminal return characteristics FDa), which are acquired by correcting initial advancement characteristics FA and terminal return characteristics FD in a range smaller than an initial depression amount Sa in a direction of increasing a reaction force by a predetermined amount; and performs initial characteristic correction on the basis of the initial characteristics.

When initial characteristic correction is performed, the reaction force setting unit 24 corrects the entirety of F-S characteristics regarding main advancement characteristics FB and main return characteristics FC in an offset manner in a direction of increasing a reaction force on the basis of the following Eq. (2).

$$Fx=(1+\alpha \times K1+\beta \times K2)\times F \quad (2)$$

where Fx is a reaction force value after correction, and α and β are coefficients.

When initial advancement characteristic correction is not performed (except that when a vehicle is started with rapid acceleration), the reaction force setting unit 24 corrects F-S characteristics depending on a driving condition on the basis of the following Eq. (3).

$$Fx=F+(\gamma \times K1+\delta \times K2)\times S \quad (3)$$

where γ and δ are coefficients.

The reaction force setting unit 24 outputs a command signal relating to a reaction force F on the basis of F-S characteristics, which are corrected by the reaction force control mechanism 11.

Figure 14:
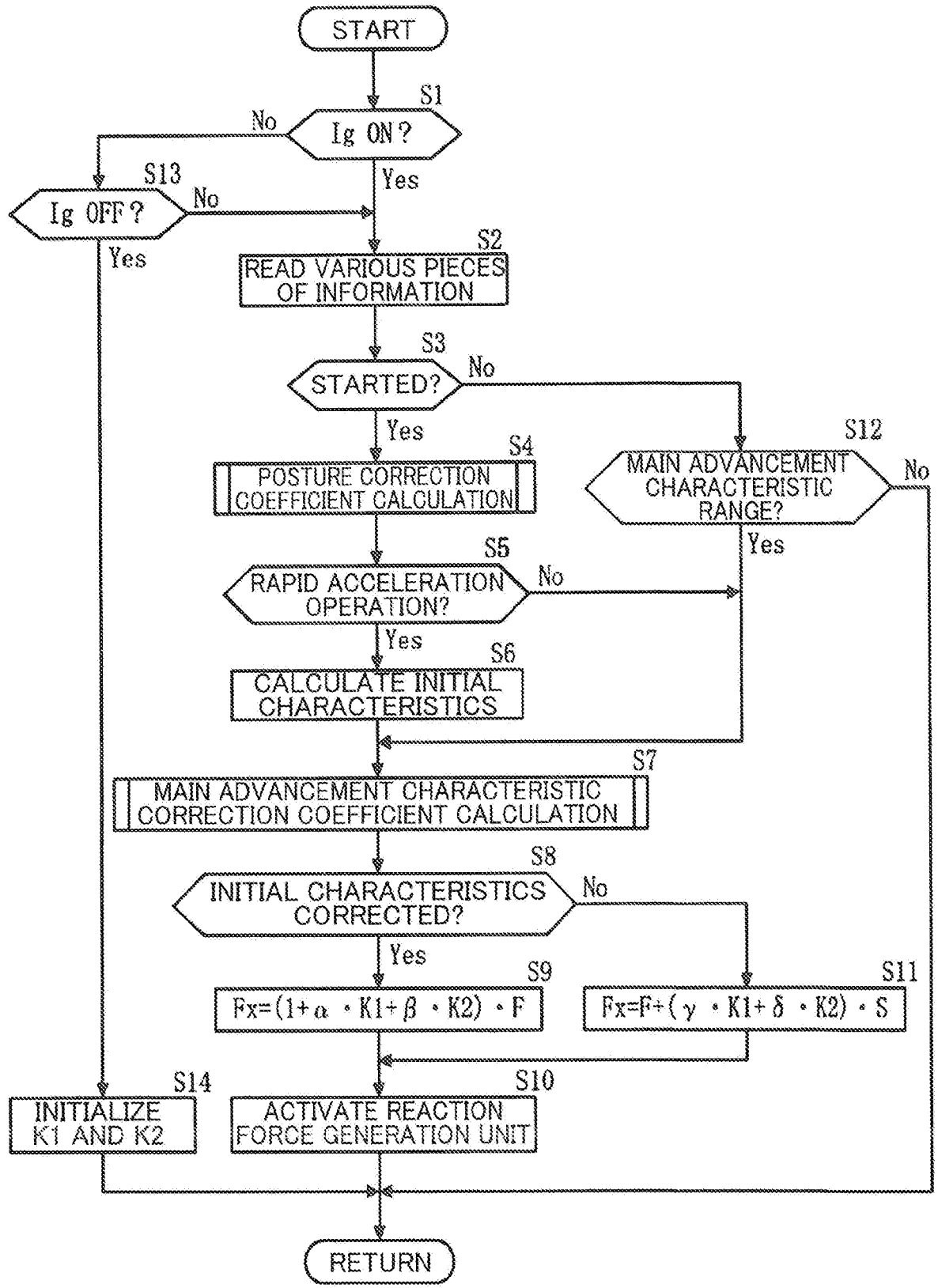
FIG. 14 is a flowchart illustrating a processing procedure of a control device.
Figure 15:
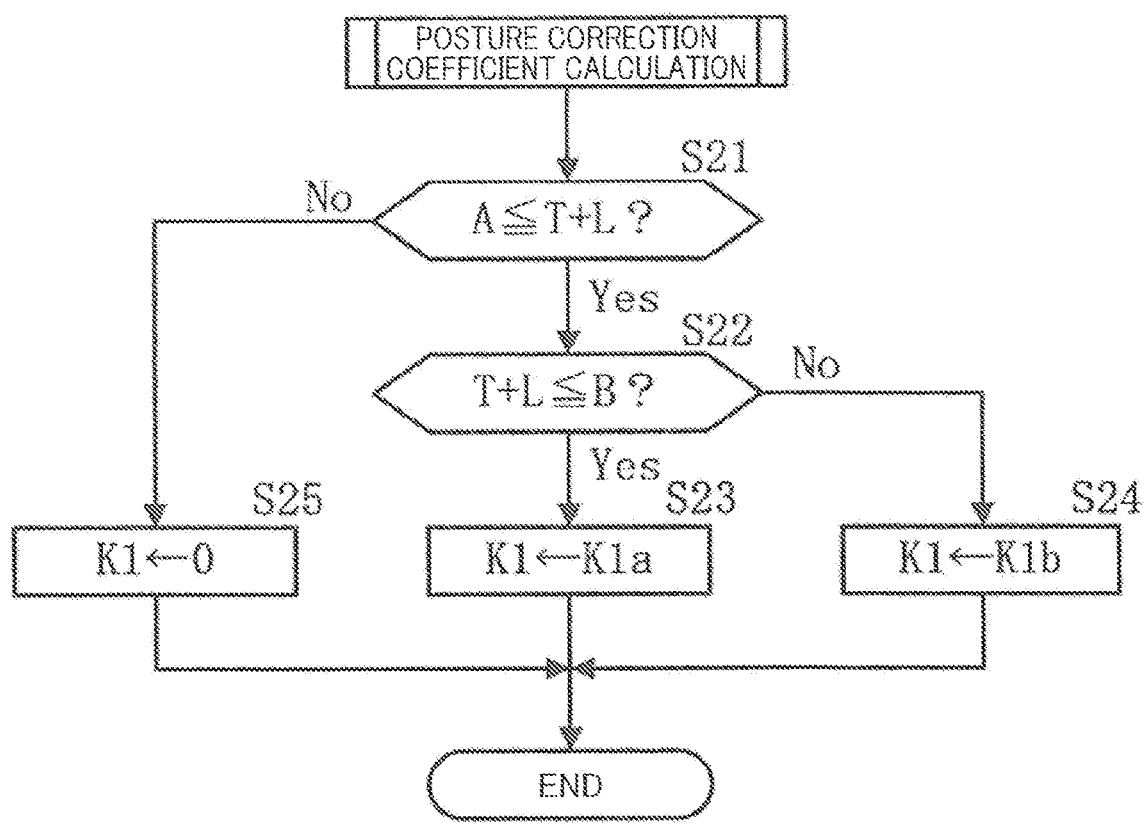
FIG. 15 is a flowchart illustrating a processing procedure of posture correction coefficient calculation.
Figure 16:
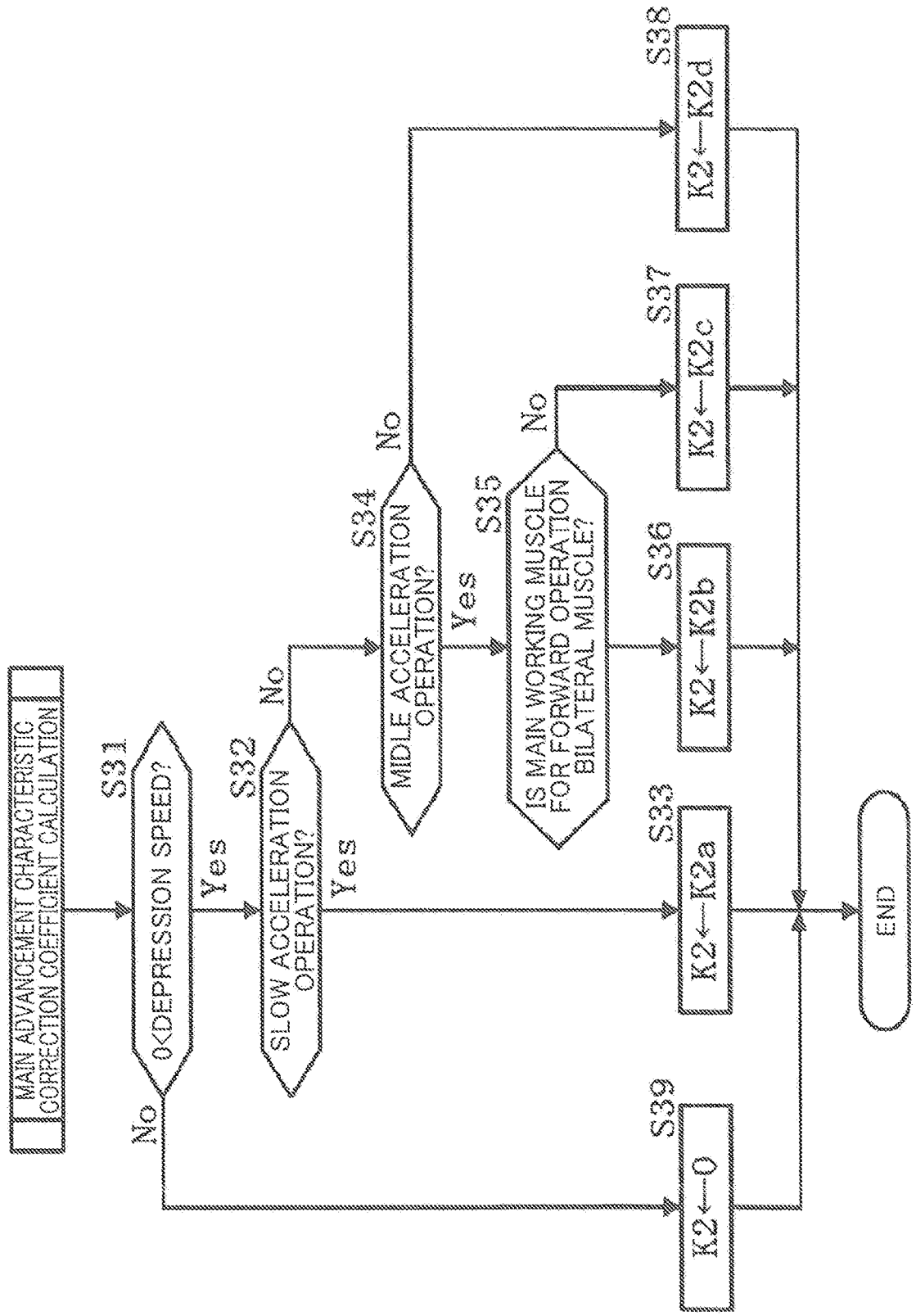
FIG. 16 is a flowchart illustrating a processing procedure of main advancement characteristic correction coefficient calculation.

Next, a control processing procedure of the control device 1 is described on the basis of flowcharts of FIGS. 14 to 16.

Note that Si (i=1, 2, . . . ) denotes a step for each processing.

As illustrated in the flowchart of FIG. 14, first, in S1, it is determined whether an ignition switch (ig) is turned on.

When the ignition switch is turned on as a determination result of 51, information input from the various sensors 4 to 9 and the navigation system 12 is read (S2), and the processing proceeds to S3.

In S3, it is determined whether a vehicle is started.

When the vehicle is started as a determination result of S3, a posture correction coefficient K1 is calculated (S4), and the processing proceeds to S5.

In S5, it is determined whether the driver starts the vehicle by a rapid acceleration operation.

When the driver performs a rapid acceleration operation as a determination result of S5, initial characteristics regarding initial advancement characteristics FA and terminal return characteristics FD are calculated (S6), and the processing proceeds to S7.

In S7, a main advancement characteristic correction coefficient K2 is calculated, and the processing proceeds to S8.

In S8, presence or absence of initial characteristic correction is determined.

When initial characteristics are corrected as a determination result of S8, a reaction force Fx after correction is calculated on the basis of Eq. (2) (S9), and the processing proceeds to S10.

In S10, the reaction force control mechanism 11 is activated on the basis of F-S characteristics reflecting the reaction force Fx after correction, and the processing returns.

When initial characteristics are not corrected as a determination result of S8, a reaction force Fx after correction is calculated on the basis of Eq. (3) (S11), and the processing proceeds to S10.

When the driver does not perform a rapid acceleration operation as a determination result of S5, the processing proceeds to S7.

When the vehicle is not started as a determination result of S3, the processing proceeds to S12, and it is determined whether the vehicle is traveling in a range corresponding to main advancement characteristics FB.

When the vehicle is traveling in a range corresponding to main advancement characteristics FB as a determination result of S12, the processing proceeds to S7. When the vehicle is not traveling in a range corresponding to main advancement characteristics FB as a determination result of S12, the processing returns.

Next, a posture correction coefficient calculation processing of S4 is described.

As illustrated in the flowchart of FIG. 15, in the posture correction coefficient calculation processing step, first, it is determined whether an addition value T+L, which is acquired by adding a seat height T and a slide amount L, is equal to or larger than a threshold value A (S21).

When the addition value T+L is equal to or larger than the threshold value A as a determination result of S21, the processing proceeds to S22, and it is determined whether the addition value T+L is equal to or smaller than a threshold value B.

When the addition value T+L is equal to or smaller than the threshold value B as a determination result of S22, since a posture state is a state in which a rate of contribution with respect to muscle activity of a bilateral muscle is low, K1a is substituted into the posture correction coefficient K1 (S23), and the processing ends.

When the addition value T+L is larger than the threshold value B as a determination result of S22, since a posture state is a state in which a rate of contribution with respect to muscle activity of a bilateral muscle is further low, K1b is substituted into the posture correction coefficient K1 (S24), and the processing ends.

When the addition value T+L is smaller than the threshold value A as a determination result of S21, since a posture state is a state in which a rate of contribution with respect to muscle activity of a bilateral muscle is high, zero (0) is substituted into the posture correction coefficient K1 (S25), and the processing ends.

Next, a main advancement characteristic correction coefficient calculation processing step of S7 is described.

As illustrated in the flowchart of FIG. 16, in the main advancement characteristic correction coefficient calculation processing step, first, it is determined whether a depression speed V of the accelerator pedal 3 is larger than zero (a depressing operation is present) (S31).

When the depression speed V of the accelerator pedal 3 is larger than zero as a determination result of S31, the processing proceeds to S32, and it is determined whether slow acceleration is performed.

When slow acceleration is performed as a determination result of S32, K2a is substituted into the main advancement characteristic correction coefficient K2 in order to increase operation accuracy in driving (S33), and the processing ends.

When slow acceleration is not performed as a determination result of S32, the processing proceeds to S34, and it is determined whether intermediate acceleration is performed.

When intermediate acceleration is performed as a determination result of S34, the processing proceeds to S35, and it is determined whether a main working muscle for a forward operation (a depressing operation) is a bilateral muscle.

When a main working muscle for a forward operation (a depressing operation) is a bilateral muscle as a determination result of S35, K2b is substituted into the main advancement characteristic correction coefficient K2 in order to correct a state that a bilateral muscle is a main working muscle to a state within a balance range (S36), and the processing ends.

When a main working muscle for a forward operation (a depressing operation) is not a bilateral muscle as a determination result of S35, K2c is substituted into the main advancement characteristic correction coefficient K2 in order to correct a state that a single articular muscle is dominant or a balanced state, to a state within a balance range (S37), and the processing ends.

When intermediate acceleration is not performed as a determination result of S34, since rapid acceleration is performed, K2d is substituted into the main advancement characteristic correction coefficient K2 in order to increase an operating speed and increase an operating force (S38), and the processing ends.

When a depression speed V of the accelerator pedal 3 is equal to or lower than zero as a determination result of S31, zero is substituted into the main advancement characteristic correction coefficient K2 (S39), and the processing ends.

F-S characteristics at each operating time is specifically described on the basis of FIGS. 17 to 21.

Note that, in FIGS. 17 to 21, in order to facilitate understanding, for convenience, downward-convex main advancement characteristics FB are indicated as a linear shape in parallel to main return characteristics Fc, and F-S characteristics are indicated as a model.

Figure 17:
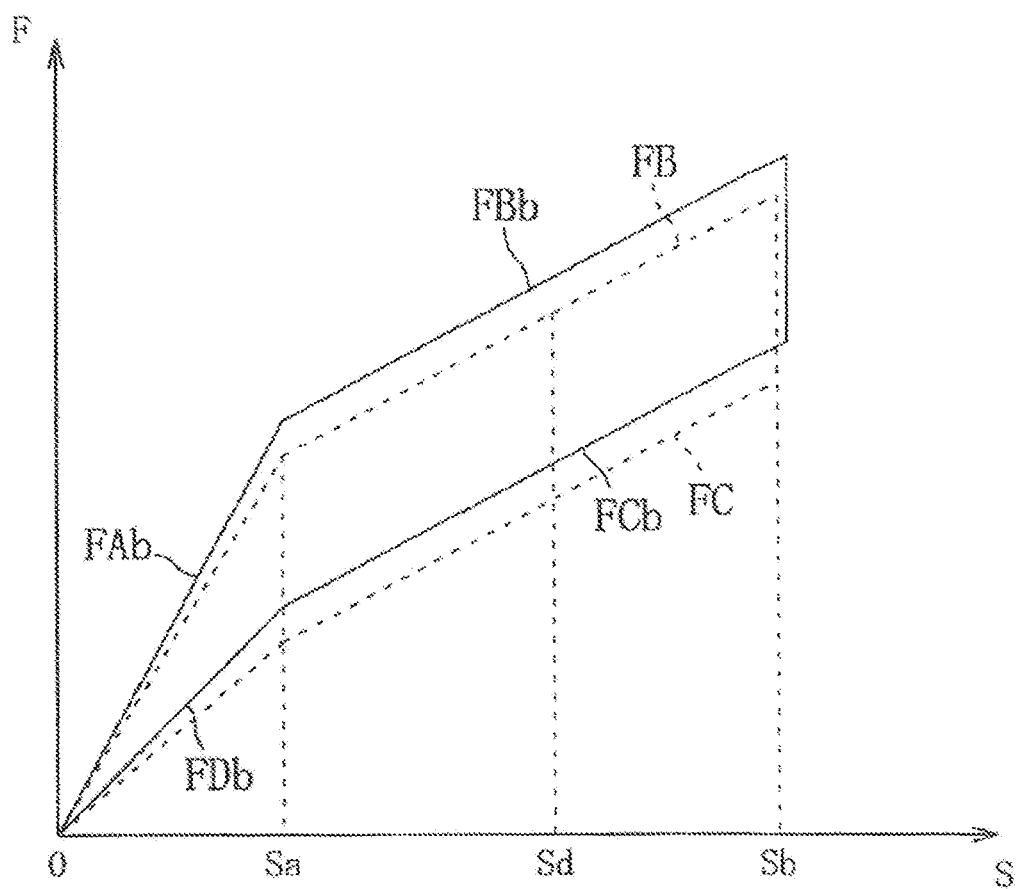
FIG. 17 is a graph of F-S characteristics when a vehicle is started with a rapid acceleration operation.

As illustrated in FIG. 17, when a vehicle is started with a rapid acceleration operation, since a main working muscle to be acted is estimated to be a bilateral muscle, initial advancement characteristics FA and terminal return characteristics FD are respectively corrected to initial advancement characteristics FAb and terminal return characteristics FDb, which are shifted upward; and main advancement characteristics FB and main return characteristics FC are also corrected to main advancement characteristics FBb and main return characteristics FCb, which are shifted upward. Thus, by shifting the entirety of F-S characteristics before correction upward in an offset manner (or a shifting manner), a reaction force F of main advancement characteristics FB is corrected to main advancement characteristics FBb composed of a reaction force Fx at which a rate of contribution of a bilateral muscle is equal to or larger than 60%. Further, in a case of a posture state in which a rate of contribution with respect to estimated muscle activity of a bilateral muscle is low, the offset amount is further increased.

Figure 18:
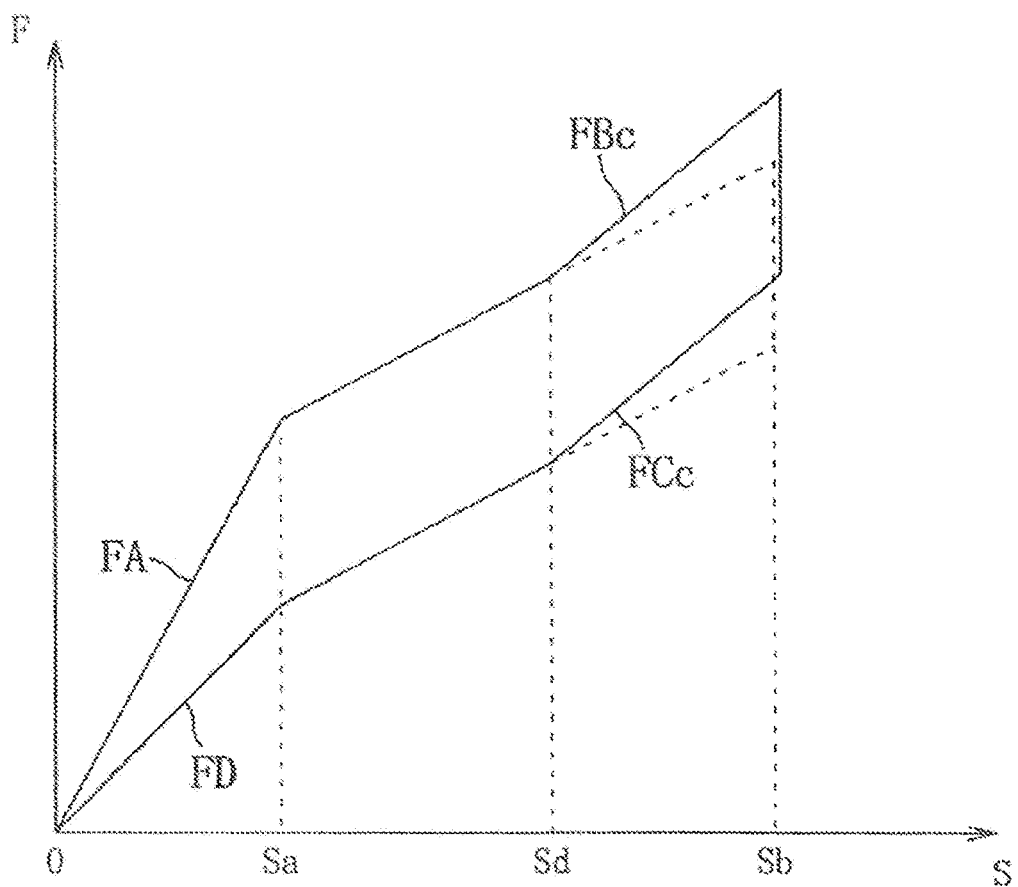
FIG. 18 is a graph of F-S characteristics when a vehicle is operated with rapid acceleration.

As illustrated in FIG. 18, when a rapid acceleration operation is performed from a state of a depression amount Sd (e.g., a vehicle merges into a main lane on a highway or cuts in), since a main working muscle to be acted is estimated to be a bilateral muscle, main advancement characteristics FBc are corrected from a depression amount Sd in such a way that a tilt angle increases and a reaction force value increases, as compared with main advancement characteristics FB. Main return characteristics FCc are also corrected similarly to main advancement characteristics FBc. Thus, a reaction force F of main advancement characteristics FB is corrected to main advancement characteristics FBc composed of a reaction force Fx at which a rate of contribution of a bilateral muscle is equal to or larger than 60%. Further, in a case of a posture state in which a rate of contribution with respect to estimated muscle activity of a bilateral muscle is low, a tendency of increase of a tilt angle and a reaction force value from a point of time corresponding to the depression amount Sd is further increased.

Figure 19:
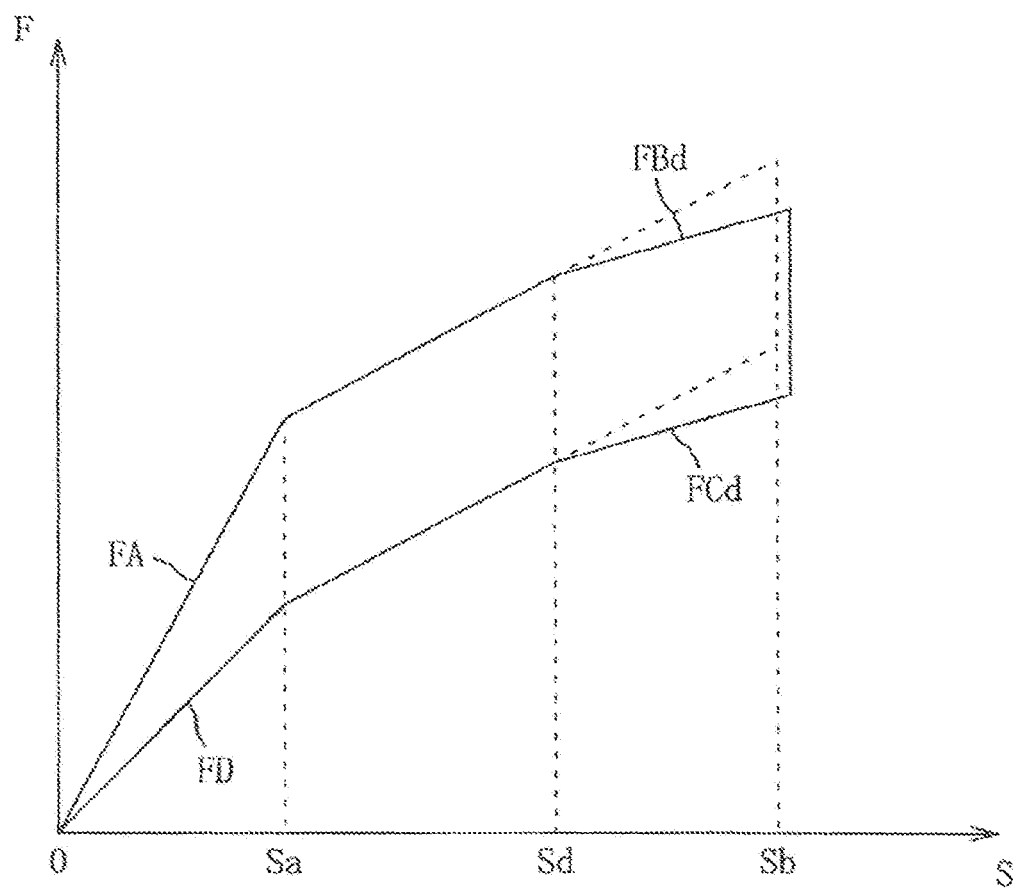
FIG. 19 is a graph of F-S characteristics when a vehicle is operated with slow acceleration.

As illustrated in FIG. 19, when a slow acceleration operation is performed from a state of a depression amount Sd (e.g., when a vehicle is traveling on a plain road), since a main working muscle to be acted is estimated to a single articular muscle, main advancement characteristics FBd are corrected from the depression amount Sd in such a way that a tilt angle decreases and a reaction force value decreases, as compared with main advancement characteristics FB.

Main return characteristics FCd are also corrected similarly to main advancement characteristics FBd. Thus, a reaction force F of main advancement characteristics FB is corrected to main advancement characteristics FBd composed of a reaction force Fx at which a rate of contribution of a bilateral muscle is smaller than 40%. Further, in a case of a posture state in which a rate of contribution with respect to estimated muscle activity of a bilateral muscle is low, a tendency of decrease of a tilt angle and a reaction force value from a state of the depression amount Sd is further decreased.

When a difference in tilt angle between main advancement characteristics FB before correction and main advancement characteristics FBc (main advancement characteristics FBd) after correction is equal to or larger than a predetermined threshold value, since a driver may feel incongruity accompanied by a change in characteristics, the control device 1 performs correction of smoothly connecting an end of main advancement characteristics FB before correction (a range immediately before a depression amount Sd), and a beginning of main advancement characteristics FBc after correction (a range immediately after the depression amount Sd).

Figure 20:
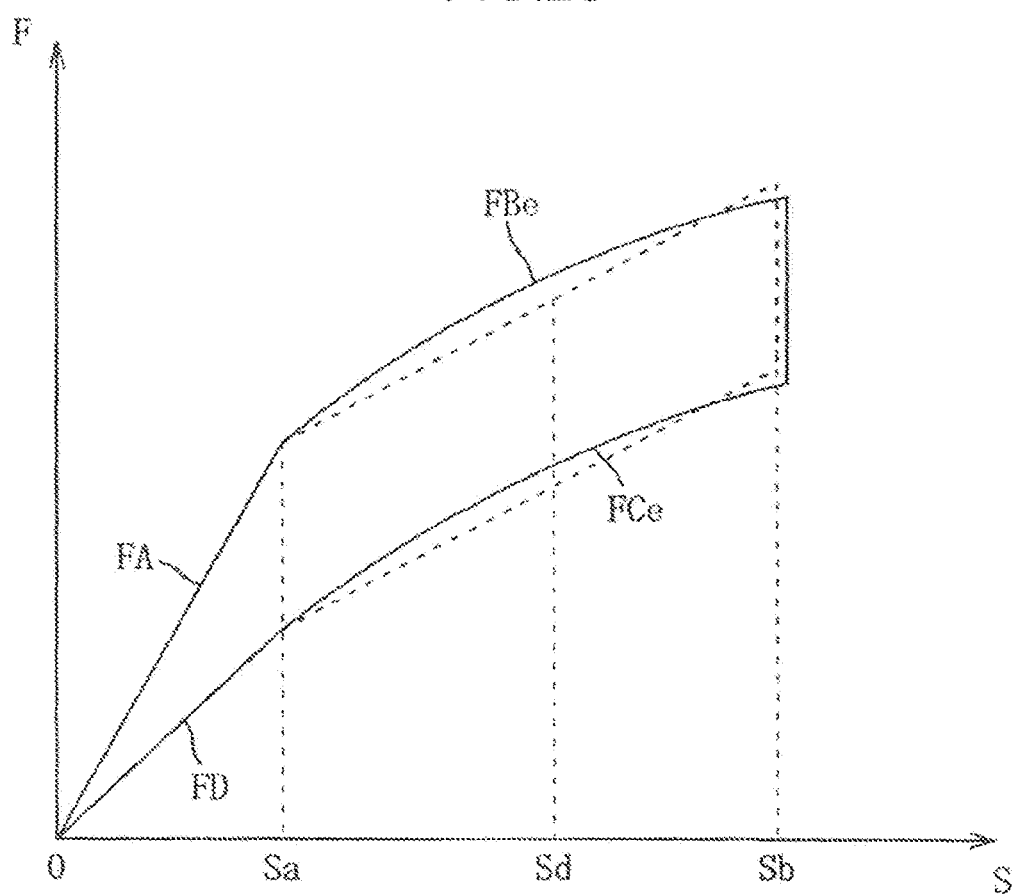
FIG. 20 is a graph of F-S characteristics when a main working muscle for a forward operation (a depressing operation) is a bilateral muscle, and when a vehicle is operated with intermediate acceleration.

As illustrated in FIG. 20, when an intermediate acceleration operation is performed while a main working muscle is a bilateral muscle (e.g., a vehicle shifts from an acceleration lane on a highway to a plain road), since it is estimated that a cooperation state of a bilateral muscle and a single articular muscle is appropriate, main advancement characteristics FBe are corrected from a depression amount Sd in such a way that a tilt angle (a tangent angle) decreases, as compared with main advancement characteristics FB. Main return characteristics FCe are also corrected similarly to main advancement characteristics FBe. Further, in a case of a posture state in which a rate of contribution with respect to estimated muscle activity of a bilateral muscle is low, a tendency of decrease of a tilt angle from a state of the depression amount Sd is decreased.

Figure 21:
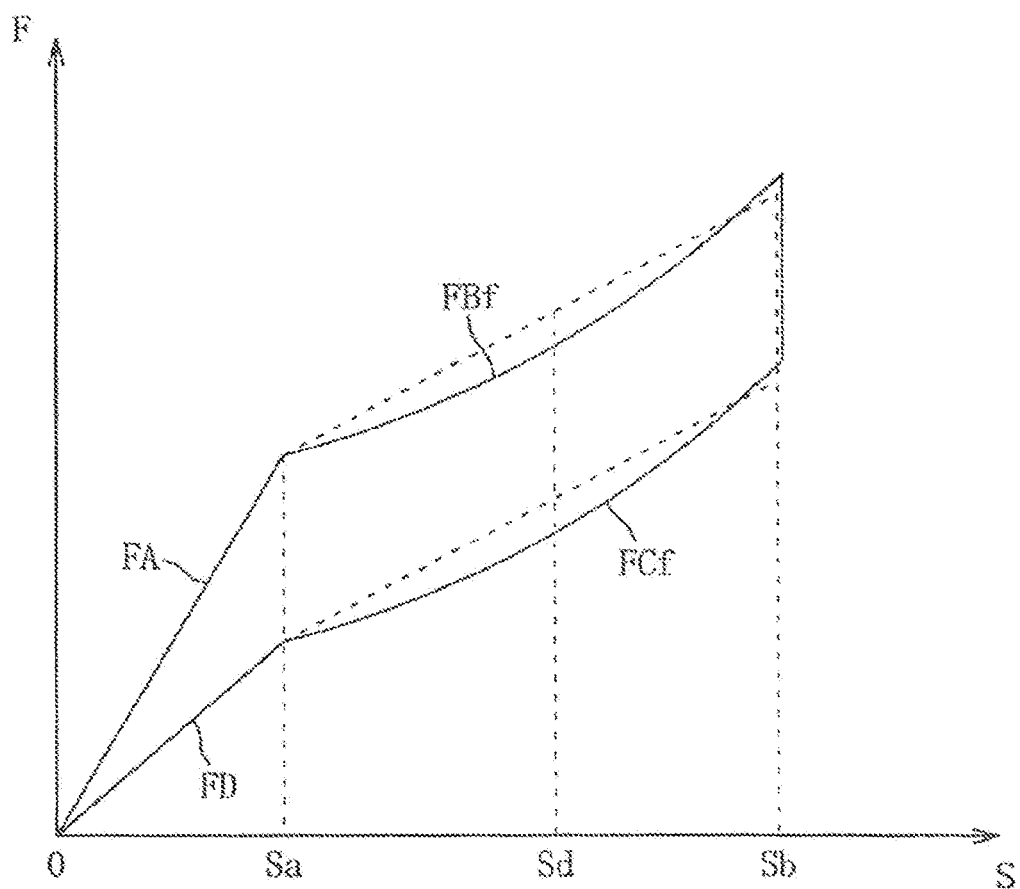
FIG. 21 is a graph of F-S characteristics when a main working muscle for a forward operation (a depressing operation) is a single articular muscle, and when a vehicle is operated with intermediate acceleration.

As illustrated in FIG. 21, when an intermediate acceleration operation is performed while a main working muscle is a single articular muscle (e.g., a vehicle shifts from a plain road to an acceleration lane on a highway), since it is estimated that a cooperation state of a bilateral muscle and a single articular muscle is appropriate, main advancement characteristics FBf are corrected from a depression amount Sd in such a way that a tilt angle increases, as compared with main advancement characteristics FB. Main return characteristics FCf are also corrected similarly to main advancement characteristics FBf. Further, in a case of a posture state in which a rate of contribution with respect to estimated muscle activity of a bilateral muscle is low, a tendency of increase of a tilt angle from a state of the depression amount Sd is increased. Note that, in a case of an intermediate acceleration operation, an upper limit and a lower limit are adjusted in such a way that a reaction force Fx after correction completion including posture correction lies within a balance range.

Next, operations and advantageous effects of the vehicle control device 1 are described.

In the control device 1, since the three-dimensional map M is set such that main advancement characteristics FB are formed into a downward convex shape, in the main advancement characteristics FB, it is possible to set F-S characteristics having linear continuity regarding a reaction force perception amount P. In other words, in the control device 1, regarding the three-dimensional map M, main advancement characteristics FB (a value of a reaction force F) are set in such a way that until a predetermined ratio (e.g., a predetermined ratio within a range from 2.5% to 5.0%) with respect to a maximum depression amount of the accelerator pedal 3 reaches, a degree of increase of a value of a reaction force F relatively decreases, as a depression amount S increases; and after the predetermined ratio reaches, a degree of increase of a value of a reaction force F relatively increases, as the depression amount S increases. In this way, since the reaction force setting unit 24 changes a value of a reaction force F exponentially functionally depending on a depression amount S of the accelerator pedal 3 in main advancement characteristics FB, it is possible to provide a driver with operation linearity, regardless of a depression speed V of the accelerator pedal 3.

Since the three-dimensional map M is formed into an exponentially functional shape, it is possible to set main advancement characteristics FB of F-S characteristics on the basis of perception characteristics of a human, for example on the basis of the Weber-Fechner rule, and it is possible to securely provide a driver with operation linearity.

The reaction force setting unit 24 decreases a degree of non-linearity of main advancement characteristics FB, as a depression speed V of the accelerator pedal 3 increases. In this configuration, it is possible to let a driver instinctively and empirically feel operation linearity, regardless of a depression speed V by strongly providing the driver with linear continuity in a low depression speed range where stimulation recognition capability is high, as compared with a high depression speed range where stimulation recognition capability is low.

Since the reaction force setting unit 24 decreases a rate of change in tangent angle of main advancement characteristics FB, as a depression amount S of the accelerator pedal 3 approaches an intermediate depression amount Sc, it is possible to set reaction force characteristics of the accelerator pedal suitable for articular viscoelastic properties of a human.

Further, since the control device 1 includes the muscle activity estimation unit 23 for estimating whether a main working muscle of the lower limb of a human body which is an activity subject is either a single articular muscle or a bilateral muscle on the basis of a driving condition, it is possible to estimate a main working muscle which is an activity subject from a viewpoint of operation performance of a driver in an actual driving condition. Since the reaction force setting unit 24 corrects a tilt angle of main advancement characteristics FB or a reaction force F of main advancement characteristics FB on the basis of a main working muscle estimated by the muscle activity estimation unit 23, it is possible to set a skeletal muscle having a performance suitable for a driving condition, as a main working muscle as necessary, and it is possible to improve driver's operation performance of the accelerator pedal 3.

The reaction force setting unit 24 corrects main advancement characteristics FB in a direction of decreasing a reaction force, when a main working muscle which is an activity subject is estimated to be a single articular muscle; and corrects main advancement characteristics FB in a direction of increasing a reaction force, when a main working muscle is estimated to be a bilateral muscle. According to this configuration, when a main working muscle which is an activity subject is estimated to be a single articular muscle, it is possible to set a rate of contribution of a single articular muscle higher than a rate of contribution of a bilateral muscle via a reaction force F of the accelerator pedal 3; and when a main working muscle which is an activity subject is estimated to be a bilateral muscle, it is possible to set a rate of contribution of a bilateral muscle higher than a rate of contribution of a single articular muscle via a reaction force F of the accelerator pedal 3.

Since the reaction force setting unit 24 corrects the entirety of main advancement characteristics FB in an offset manner, it is possible to adjust a rate of contribution of a skeletal muscle with a simple configuration in terms of control processing.

Since the vehicle control device 1 includes the depression speed sensor 5 for detecting a depression speed V of the accelerator pedal 3, and the muscle activity estimation unit 23 estimates a main working muscle on the basis of a depression speed V of the accelerator pedal 3 at a depression initial stage, the depression speed V being detected by the depression speed sensor 5, it is possible to adjust a rate of contribution of a skeletal muscle in conformity with a change in driving condition.

Second Embodiment

Figure 22:
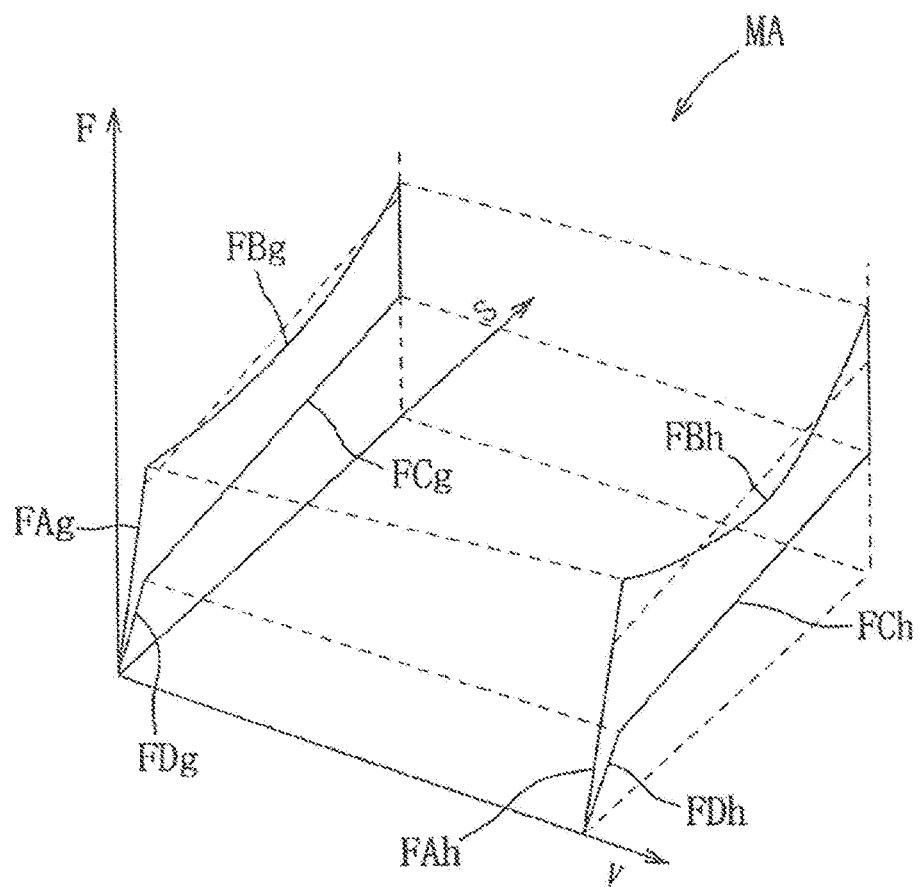
FIG. 22 is a diagram illustrating a three-dimensional map according to a second embodiment.

Next, a three-dimensional map MA according to a second embodiment is described on the basis of FIG. 22.

Whereas the three-dimensional map M in the first embodiment is configured to decrease a degree of non-linearity of main advancement characteristics FB, as a depression speed V of the accelerator pedal 3 increases, the three-dimensional map MA in the second embodiment is configured to increase a degree of non-linearity of main advancement characteristics FB, as a depression speed V of an accelerator pedal 3 increases.

Note that constituent elements similar to those of the first embodiment are indicated with same reference numbers.

As illustrated in FIG. 22, regarding F-S characteristics in the three-dimensional map MA, depression-side characteristics are constituted of initial advancement characteristics FAg (Fah) from start of depressing until an initial depression amount Sa, which corresponds to a depression start range, and main advancement characteristics FBg (FBh) from the initial depression amount Sa to a maximum depression amount Sb. Further, return-side characteristics are constituted of main return characteristics FCg (FCh) from the maximum depression amount Sb to the initial depression amount Sa, and terminal return characteristics FDg (FDh) from the initial depression amount Sa until end of returning, which corresponds to a depression end range.

The three-dimensional map MA is configured in such a way that a degree of non-linearity of main advancement characteristics FB increases, as a depression speed V of the accelerator pedal 3 increases.

Main advancement characteristics FBh at a high depression speed is set into a downward-convex exponential functional shape in which a rate of change in tangent angle is large, as compared with main advancement characteristics FB at a low depression speed.

Thus, it is possible to let a driver feel uniform operation linearity, regardless of a depression speed V by letting the driver strongly perceive linear continuity in a high depression speed range where stimulation recognition capability is low, as compared with a low depression speed range where stimulation recognition capability is high, since an amount of muscle activity is large.

Third Embodiment

Figure 23:
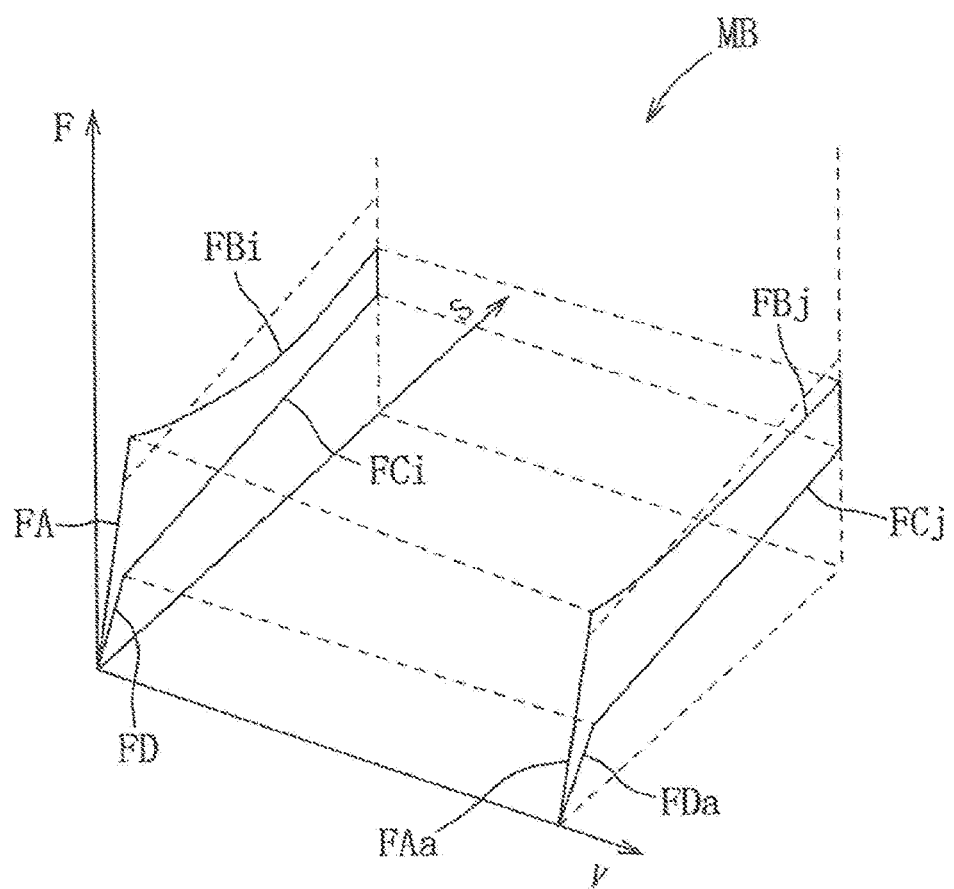
FIG. 23 is a diagram illustrating a three-dimensional map according to a third embodiment.
Figure 24:
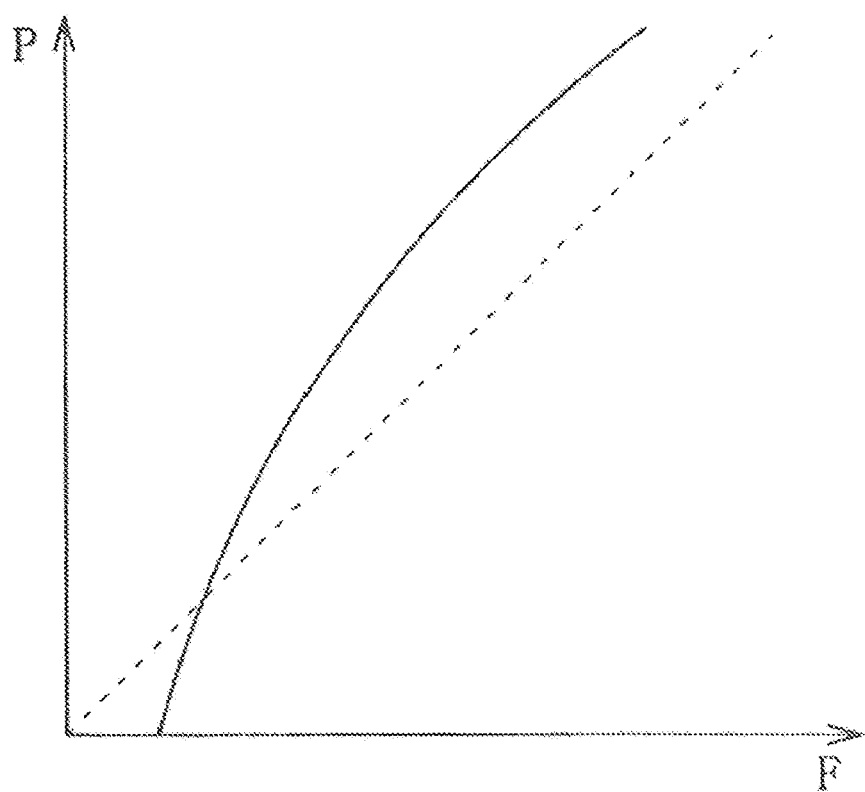
FIG. 24 is a graph describing P-F characteristics at a low depression speed.
Figure 25:
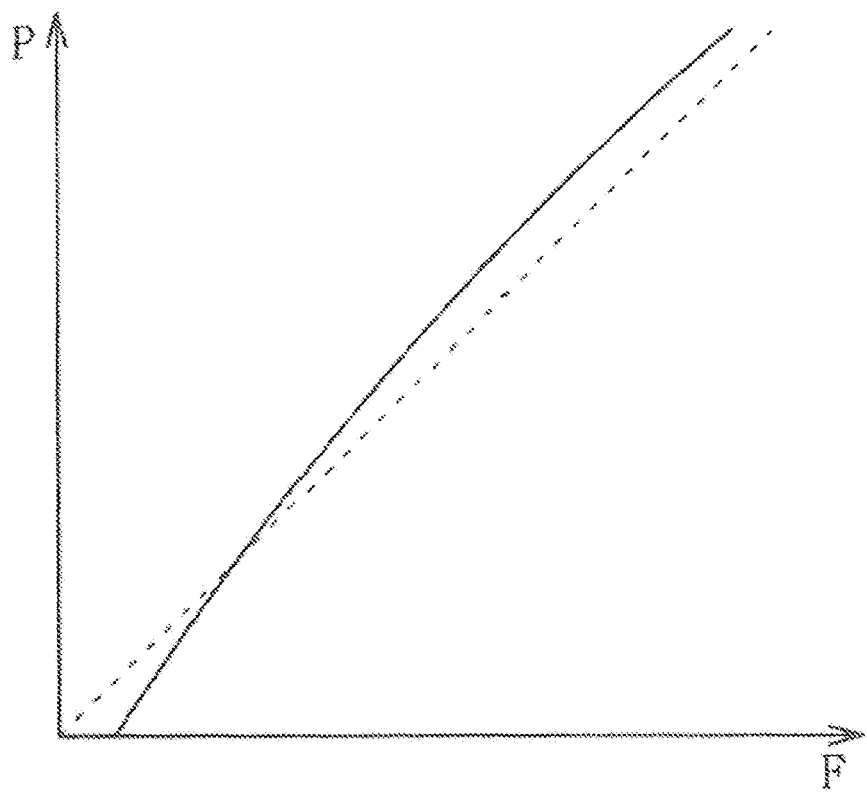
FIG. 25 is a graph describing P-F characteristics at a high depression speed.

Next, a three-dimensional map MB according to a third embodiment is described on the basis of FIGS. 23, 24, and 25.

Whereas the three-dimensional map M in the first embodiment is configured to decrease a rate of change in tangent angle of main advancement characteristics FB, as a depression amount approaches an intermediate depression amount Sc at a midpoint between an initial depression amount Sa and a maximum depression amount Sb, the three-dimensional map MB in the third embodiment is configured in such a way that a depression amount is displaced from an intermediate depression amount Sc, when a rate of change in tangent angle of main advancement characteristics FBi (FBj) is smallest.

As illustrated in FIG. 23, the three-dimensional map MB includes F-S characteristics at a low depression speed, which are composed of characteristics Fa, FBi, FCi, and FD, and F-S characteristics at a high depression speed, which are composed of characteristics FAa, FBj, FCj, and FDa. The three-dimensional map MB is configured to decrease a degree of non-linearity of main advancement characteristics FBi, as a depression speed V of an accelerator pedal 3 increases.

As described above, it is possible to let a driver perceive a reaction force perception amount P having linear continuity, which is indicated by the broken line, by setting P-F characteristics into an upward-convex logarithmic functional shape.

Herein, since a bottom of the above-described logarithmic function differs depending on an individual difference among drivers (e.g., a physical constitution or an intensity of depressing force), when a reaction force F at end of depressing is fixed, the three-dimensional map MB has characteristics such that a depression amount shifts from the intermediate depression amount Sc, when a rate of change in tangent angle decreases.

As illustrated in FIGS. 24 and 25, in a case of a driver whose bottom of P-F characteristics is small, as compared with a driver in the first embodiment, a depression amount is set to be larger than the intermediate depression amount Sc, when a rate of change in tangent angle of main advance characteristics FBi is smallest.

Further, in a case of a driver whose bottom of P-F characteristics is large, as compared with a driver in the first embodiment, a depression amount is set to be smaller than the intermediate depression amount Sc, when a rate of change in tangent angle of main advance characteristics FBi is smallest. Thus, it is possible to let a driver feel uniform operation linearity, regardless of an individual difference among drivers.

Next, modifications in which each of the first to third embodiments is partially modified are described.

1] In the first to third embodiments, an example employing a reaction force control mechanism constituted of an actuator and a friction member is described. Alternatively, an accelerator-by-wire mechanism including a reaction motor may be employed.

2] In the first to third embodiments, an example in which main advancement characteristics are formed into an exponential functional shape, and main return characteristics are formed into a linear shape is described. Alternatively, main return characteristics may be formed into an exponential functional shape in parallel to main advancement characteristics.

3] In the first to third embodiments, an example in which a driving condition is detected by a depression speed sensor is described. Alternatively, a driving condition may be predicted on the basis of current position data of a navigation system, road map data, and traffic rule data. In this case, a main working muscle is estimated depending on a predicted driving condition.

4] In the first to third embodiments, an example in which an entirety of F-S characteristics is corrected in a direction of increasing a reaction force in an offset manner, when a vehicle is started with rapid acceleration. Alternatively, only initial main characteristics and terminal return characteristics may be corrected to increase.

Further, it may be possible to correct to increase only initial main characteristics and terminal return characteristics, correct in such a way that a bilateral muscle is dominant until an intermediate stage of a depression amount, and correct in such a way that a single articular muscle is dominant in a stage later than the intermediate stage.

5] In the first to third embodiments, an example in which an acceleration state is classified into four groups, namely, slow acceleration, intermediate acceleration after a bilateral muscle acts as a main working muscle, intermediate acceleration after a single articular muscle acts as a main working muscle, and rapid acceleration is described. Alternatively, an acceleration state may be classified into three groups or less, classified into five groups or more, or linear correction depending on an acceleration value may be performed.

Further, an example in which a tilt angle and a reaction force value are increased or decreased depending on a driving condition is described. Alternatively, only one of a tilt angle and a reaction force value may be corrected.

6] In addition to the above, a person skilled in the art may implement a configuration in which various modifications are added to each of the first to third embodiments, or a configuration in which the embodiments are combined, as far as the modifications do not depart from the gist of the present disclosure. The present disclosure includes such modifications.

[Summary of Present Disclosure]

A vehicle control device according to an aspect of the present disclosure includes a depression amount detection unit for detecting a depression amount of an accelerator pedal; a depression speed detection unit for detecting a depression speed of the accelerator pedal; a reaction force setting unit for setting a value of a reaction force of the accelerator pedal on the basis of detection results by the depression amount detection unit and the depression speed detection unit; and a reaction force generation unit for controlling a mechanism of the accelerator pedal on the basis of a result set by the reaction force setting unit, and generating the set reaction force. The reaction force setting unit sets a value of the reaction force in a manner of separating characteristics into advancement characteristics and return characteristics, the advancement characteristics being characteristics of a value of the reaction force having a correlation with respect to a depression amount of the accelerator pedal from start of depressing the accelerator pedal until end of depressing, and the return characteristics being characteristics of a value of the reaction force having a correlation with respect to a depression amount of the accelerator pedal from start of returning the accelerator pedal until end of returning. The reaction force setting unit sets a value of the reaction force with respect to the depression amount in such a way that, in main advancement characteristics except for both ranges corresponding to start of depressing and end of depressing among the advancement characteristics, a degree of increase of a value of the reaction force relatively decreases, as the depression amount increases until a predetermined ratio with respect to a maximum depression amount of the accelerator pedal reaches, and a degree of increase of a value of the reaction force relatively increases, as the depression amount increases after the predetermined ratio reaches. The reaction force setting unit sets a value of the reaction force in such a way that a value of the reaction force decreases, as the depression amount decreases in the return characteristics.

In the vehicle control device, a value of the reaction force in main advancement characteristics is set in such a way that a degree of increase of a value of the reaction force relatively decreases, as the depression amount increases until a predetermined ratio with respect to a maximum depression amount of the accelerator pedal reaches, and a degree of increase of a value of the reaction force relatively increases, as the depression amount increases after the predetermined ratio reaches. Therefore, it is possible to set reaction force characteristics (F-S characteristics) of the accelerator pedal having linear continuity regarding a reaction force perception amount.

Therefore, in the vehicle control device according to the above aspect, since main advancement characteristics are changed depending on a depression amount of the accelerator pedal, it is possible to provide a driver with operation linearity, regardless of a depression speed of the accelerator pedal.

A vehicle control device according to another aspect of the present disclosure further includes, in the above aspect, a storage unit for storing in advance a control map that defines the correlation in each of the advancement characteristics and the return characteristics. The reaction force setting unit sets a value of the reaction force by referring to the control map stored in the storage unit. The control map is defined in such a way that the correlation in the advancement characteristics has the depression amount represented along a horizontal axis, and a value of the reaction force represented along a vertical axis. In the control map, the correlation in the advancement characteristics is set into an exponential functional shape.

According to this configuration, it is possible to set main advancement characteristics of reaction force characteristics of the accelerator pedal on the basis of perception characteristics of a human, and it is possible to securely provide a driver with operation linearity.

A vehicle control device according to another aspect of the present disclosure is such that, in the above aspect, the reaction force setting unit decreases a degree of non-linearity of the main advancement characteristics, as a depression speed of the accelerator pedal increases.

According to this configuration, it is possible to let a driver instinctively and empirically feel operation linearity, regardless of a depression speed by strongly providing the driver with linear continuity in a low depression speed range where stimulation recognition capability is high, as compared with a high depression speed range where stimulation recognition capability is low.

A vehicle control device according to another aspect of the present disclosure is such that, in the above aspect, the reaction force setting unit decreases a rate of change in tangent angle of the main advancement characteristics, as a depression amount of the accelerator pedal approaches an intermediate value.

According to this configuration, it is possible to set reaction force characteristics of the accelerator pedal suitable for articular viscoelastic properties of a human.

A vehicle control device according to another aspect of the present disclosure further includes, in the above aspect, a muscle activity estimation unit for estimating whether a main working muscle of a lower limb of a human body which is an activity subject is a single articular muscle or a bilateral muscle on the basis of a driving condition. The reaction force setting unit corrects the correlation in the main advancement characteristics or a value of the reaction force of the main advancement characteristics on the basis of a main working muscle estimated by the muscle activity estimation unit.

According to this configuration, since the vehicle control device includes a muscle activity estimation unit for estimating whether a main working muscle of the lower limb of a human body which is an activity subject is a single articular muscle or a bilateral muscle on the basis of a driving condition, it is possible to estimate a main working muscle which is an activity subject from a viewpoint of operation performance of a driver in an actual driving condition. Since the reaction force setting unit corrects a tilt angle of main advancement characteristics or a reaction force value of main advancement characteristics except for a depression start range and a depression end range on the basis of a main working muscle estimated by the muscle activity estimation unit, it is possible to set a skeletal muscle having performance suitable for a driving condition, as a main working muscle as necessary, and it is possible to improve driver's operation performance of the accelerator pedal.

A vehicle control device according to another aspect of the present disclosure is such that, in the above aspect, the reaction force setting unit corrects the main advancement characteristics in a direction of decreasing a reaction force, when a main working muscle which is the activity subject is estimated to be a single articular muscle, and corrects the main advancement characteristics in a direction of increasing a reaction force, when a main working muscle is estimated to be a bilateral muscle.

According to this configuration, when a main working muscle which is an activity subject is estimated to be a single articular muscle, it is possible to set a rate of contribution of a single articular muscle higher than a rate of contribution of a bilateral muscle via a reaction force of the accelerator pedal; and when a main working muscle which is an activity subject is estimated to be a bilateral muscle, it is possible to set a rate of contribution of a bilateral muscle higher than a rate of contribution of a single articular muscle via a reaction force of the accelerator pedal.

A vehicle control device according to another aspect of the present disclosure is such that, in the above aspect, the reaction force setting unit performs the correction in such a way that an end of main advancement characteristics before correction and a beginning of main advancement characteristics after correction are smoothly connected.

According to this configuration, since correction is performed in such a way that an end of main advancement characteristics before correction, and a beginning of main advancement characteristics after correction are smoothly connected, a driver is less likely to feel incongruity accompanied by a change in characteristics.

A vehicle control device according to another aspect of the present disclosure is such that, in the above aspect, the reaction force setting unit corrects a value of the reaction force in an offset manner in an entirety of the main advancement characteristics.

According to this configuration, it is possible to adjust a rate of contribution of a skeletal muscle with a simple configuration in terms of control processing regarding an end of main advancement characteristic before correction and a beginning of main advancement characteristics after correction.

A vehicle control device according to another aspect of the present disclosure is such that, in the above aspect, the muscle activity estimation unit estimates whether a main working muscle is the single articular muscle or the bilateral muscle on the basis of a depression speed of the accelerator pedal at a depression initial stage, the depression speed being detected by the depression speed detection unit.

According to this configuration, it is possible to adjust a rate of contribution of a skeletal muscle in conformity with a change in driving condition.

As described above, a vehicle control device according to each aspect of the present disclosure is able to provide a driver with operation linearity, regardless of a depression speed of an accelerator pedal, and is able to let the driver sufficiently and instinctively perceive a feeling of operation.

The invention claimed is:
1. A vehicle control device comprising:
a depression amount detection unit for detecting a depression amount of an accelerator pedal;
a depression speed detection unit for detecting a depression speed of the accelerator pedal;
a reaction force setting unit for setting a value of a reaction force of the accelerator pedal on the basis of detection results by the depression amount detection unit and the depression speed detection unit;
a reaction force generation unit for controlling a mechanism of the accelerator pedal on the basis of a result set by the reaction force setting unit and generating the set reaction force; and
a muscle activity estimation unit for estimating whether a main working muscle of a lower limb of a human body which is an activity subject is a single articular muscle or a bilateral muscle on the basis of a driving condition; wherein
the reaction force setting unit sets a value of the reaction force in a manner of separating characteristics into advancement characteristics and return characteristics, the advancement characteristics being characteristics of a value of the reaction force having a correlation with respect to a depression amount of the accelerator pedal from a start of depressing the accelerator pedal until an end of depressing, and the return characteristics being characteristics of a value of the reaction force having a correlation with respect to a depression amount of the accelerator pedal from a start of returning the accelerator pedal until an end of returning, and
the reaction force setting unit sets a value of the reaction force with respect to the depression amount in such a way that, in main advancement characteristics except for advancement characteristics corresponding to the start of depressing the accelerator pedal and advancement characteristics corresponding to the end of depressing the accelerator pedal, a degree of increase of a value of the reaction force relatively decreases as the depression amount increases below a range from 40% to 60% of a maximum depression amount of the accelerator pedal, and a degree of increase of a value of the reaction force relatively increases as the depression amount increases within the range from 40% to 60% of the maximum depression amount of the accelerator pedal, and
the reaction force setting unit sets a value of the reaction force in such a way that a value of the reaction force decreases, as the depression amount decreases in the return characteristics, and
the reaction force setting unit corrects the main advancement characteristics in a direction of decreasing a reaction force when a main working muscle which is the activity subject is estimated to be a single articular muscle, and corrects the main advancement characteristics in a direction of increasing a reaction force when a main working muscle is estimated to be a bilateral muscle.

2. The vehicle control device according to claim 1, further comprising:
a storage unit for storing in advance a three-dimensional map that defines the correlation in each of the advancement characteristics and the return characteristics, wherein
the reaction force setting unit sets a value of the reaction force by referring to the three-dimensional map stored in the storage unit,
the three-dimensional map is defined in such a way that the correlation in the advancement characteristics has the depression amount represented along a horizontal axis, and a value of the reaction force represented along a vertical axis, and
in the three-dimensional map, the correlation in the advancement characteristics is set into an exponential functional shape.

3. The vehicle control device according to claim 2, wherein
the reaction force setting unit decreases a degree of non-linearity of the main advancement characteristics, as a depression speed of the accelerator pedal increases.

4. The vehicle control device according to claim 3, wherein
the reaction force setting unit decreases a rate of change in tangent angle of the main advancement characteristics, as a depression amount of the accelerator pedal approaches an intermediate value.

5. The vehicle control device according to claim 2, wherein
the reaction force setting unit decreases a rate of change in tangent angle of the main advancement characteristics, as a depression amount of the accelerator pedal approaches an intermediate value.

6. The vehicle control device according to claim 1, wherein
the reaction force setting unit decreases a rate of change in tangent angle of the main advancement characteristics, as a depression amount of the accelerator pedal approaches an intermediate value.

7. The vehicle control device according to claim 1, wherein
the reaction force setting unit performs the correction in such a way that an end of main advancement characteristics before correction and a beginning of main advancement characteristics after correction are consecutively connected.

8. The vehicle control device according to claim 7, wherein
the muscle activity estimation unit estimates whether a main working muscle is the single articular muscle or the bilateral muscle on the basis of a depression speed of the accelerator pedal at a depression initial stage, the depression speed being detected by the depression speed detection unit.

9. The vehicle control device according to claim 1, wherein
the reaction force setting unit corrects a value of the reaction force in an offset manner in an entirety of the main advancement characteristics.

10. The vehicle control device according to claim 1, wherein
the muscle activity estimation unit estimates whether a main working muscle is the single articular muscle or the bilateral muscle on the basis of a depression speed of the accelerator pedal at a depression initial stage, the depression speed being detected by the depression speed detection unit.

* * * * *